US009605208B2

(12) United States Patent
Kaneoya et al.

(10) Patent No.: US 9,605,208 B2
(45) Date of Patent: Mar. 28, 2017

(54) NEMATIC LIQUID CRYSTAL COMPOSITION

(71) Applicant: DIC CORPORATION, Tokyo (JP)

(72) Inventors: Masakazu Kaneoya, Kita-adachi-gun (JP); Kiyofumi Takeuchi, Kita-adachi-gun (JP); Masashi Osawa, Kita-adachi-gun (JP); Kenta Tojo, Kita-adachi-gun (JP); Tetsuo Kusumoto, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/419,308

(22) PCT Filed: Jul. 24, 2013

(86) PCT No.: PCT/JP2013/070057
§ 371 (c)(1),
(2) Date: Feb. 3, 2015

(87) PCT Pub. No.: WO2014/030481
PCT Pub. Date: Feb. 27, 2014

(65) Prior Publication Data
US 2015/0184076 A1    Jul. 2, 2015

(30) Foreign Application Priority Data

Aug. 22, 2012 (JP) ................................. 2012-183220

(51) Int. Cl.
| | | |
|---|---|---|
| *C09K 19/00* | (2006.01) |
| *C09K 19/34* | (2006.01) |
| *C09K 19/20* | (2006.01) |
| *C09K 19/32* | (2006.01) |
| *C09K 19/44* | (2006.01) |
| *G02F 1/1337* | (2006.01) |
| *G02F 1/137* | (2006.01) |
| *C09K 19/04* | (2006.01) |
| *C09K 19/12* | (2006.01) |
| *C09K 19/30* | (2006.01) |

(52) U.S. Cl.
CPC .......... *C09K 19/3402* (2013.01); *C09K 19/20* (2013.01); *C09K 19/322* (2013.01); *C09K 19/44* (2013.01); *G02F 1/137* (2013.01); *G02F 1/1337* (2013.01); *G02F 1/133723* (2013.01); *C09K 2019/0448* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3012* (2013.01); *C09K 2019/3016* (2013.01); *C09K 2019/3019* (2013.01); *C09K 2019/3025* (2013.01); *C09K 2019/3422* (2013.01); *G02F 2001/13706* (2013.01); *Y10T 428/10* (2015.01); *Y10T 428/1005* (2015.01); *Y10T 428/1018* (2015.01); *Y10T 428/1023* (2015.01)

(58) Field of Classification Search
CPC  C09K 19/3402; C09K 19/20; C09K 19/3066; C09K 2019/3422; C09K 2019/322; C09K 2019/0448; C09K 2019/0466; C09K 2019/122; C09K 2019/123; C09K 2019/301; C09K 2019/3004; C09K 2019/3012; G02F 1/1337; G02F 1/133723; G02F 2001/13706; Y10T 428/10; Y10T 428/1005; Y10T 428/1018; Y10T 428/1023
USPC ................. 428/1.1, 1.25; 252/299.01, 299.5, 252/299.61–299.67
See application file for complete search history.

(56) References Cited

U.S. PATENT DOCUMENTS

| | | |
|---|---|---|
| 5,730,904 A | 3/1998 | Bartmann et al. |
| 5,733,477 A | 3/1998 | Kondo et al. |
| 5,800,734 A | 9/1998 | Buchecker et al. |
| 6,207,076 B1 | 3/2001 | Koga et al. |
| 6,210,603 B1 | 4/2001 | Kondo et al. |
| 6,254,941 B1 | 7/2001 | Kondou et al. |
| 7,198,827 B1 | 4/2007 | Takeuchi et al. |

(Continued)

FOREIGN PATENT DOCUMENTS

| | | |
|---|---|---|
| CN | 1184462 A | 6/1998 |
| DE | 44 16 256 A1 | 11/1994 |

(Continued)

OTHER PUBLICATIONS

International Search Report dated Sep. 17, 2013, issued in corresponding application No. PCT/JP2013/070057.

(Continued)

Primary Examiner — Ruiyun Zhang
(74) Attorney, Agent, or Firm — Westerman, Hattori, Daniels & Adrian, LLP

(57) ABSTRACT

A liquid crystal composition exhibits a positive dielectric anisotropy and sufficiently low viscosity without decreasing or increasing refractive index anisotropy or nematic phase-isotropic liquid phase transition temperature, and does not cause display failures. The liquid crystal composition contains one or more compounds selected from compounds represented by general formula (LC0) and one or more compounds selected from a group of compounds represented by general formula (LC1) to general formula (LC5), in which the liquid crystal composition contains one or more compounds in which at least one of $A^{01}$, $A^{02}$, and $A^{11}$ to $A^{42}$ in general formulae (LC0) to (LC4) represents a tetrahydro-pyran-2,5-diyl group.

20 Claims, No Drawings

(56) References Cited

U.S. PATENT DOCUMENTS

| | | | |
|---|---|---|---|
| 8,916,718 | B2 | 12/2014 | Tojo et al. |
| 9,039,929 | B2 | 5/2015 | Kaneoya et al. |
| 9,079,836 | B2 | 7/2015 | Tojo et al. |
| 2002/0166994 | A1 | 11/2002 | Kondo et al. |
| 2003/0197153 | A1 | 10/2003 | Heckmeier et al. |
| 2005/0012073 | A1 | 1/2005 | Goulding et al. |
| 2006/0061699 | A1 | 3/2006 | Kirsch et al. |
| 2006/0263542 | A1 | 11/2006 | Kirsch et al. |
| 2006/0286308 | A1 | 12/2006 | Kirsch et al. |
| 2007/0134444 | A1 | 6/2007 | Harding et al. |
| 2007/0205396 | A1 | 9/2007 | Czanta et al. |
| 2009/0103011 | A1 | 4/2009 | Bernatz et al. |
| 2009/0230355 | A1 | 9/2009 | Czanta et al. |
| 2009/0302273 | A1 | 12/2009 | Tanaka |
| 2010/0294991 | A1 | 11/2010 | Saito et al. |
| 2011/0001090 | A1 | 1/2011 | Wittek et al. |
| 2011/0037912 | A1 | 2/2011 | Saito et al. |
| 2011/0233466 | A1 | 9/2011 | Jansen et al. |
| 2011/0253934 | A1 | 10/2011 | Lietzau et al. |
| 2011/0291048 | A1 | 12/2011 | Hamano et al. |
| 2011/0315925 | A1 | 12/2011 | Hiraoka et al. |
| 2013/0300996 | A1 | 11/2013 | Takeuchi et al. |
| 2013/0306908 | A1 | 11/2013 | Jansen et al. |
| 2014/0225036 | A1* | 8/2014 | Kaneoya ............... C09K 19/20 252/299.61 |
| 2014/0275577 | A1 | 9/2014 | Tojo et al. |
| 2015/0087847 | A1 | 3/2015 | Tojo et al. |
| 2015/0124205 | A1 | 5/2015 | Kaneoya et al. |
| 2015/0159086 | A1 | 6/2015 | Kaneoya et al. |
| 2015/0184076 | A1 | 7/2015 | Kaneoya et al. |
| 2015/0203757 | A1 | 7/2015 | Kaneoya et al. |
| 2015/0218451 | A1 | 8/2015 | Kaneoya et al. |
| 2015/0322343 | A1 | 11/2015 | Kaneoya et al. |

FOREIGN PATENT DOCUMENTS

| | | | |
|---|---|---|---|
| DE | 10 2009 009 631 | A1 | 9/2009 |
| DE | 102010015824 | A1 | 3/2011 |
| DE | 112013004132 | T5 | 5/2015 |
| EP | 0 882 696 | A1 | 12/1998 |
| JP | 8-283183 | A | 10/1996 |
| JP | 9-157202 | A | 6/1997 |
| JP | 10-130187 | A | 5/1998 |
| JP | 2001-019649 | A | 1/2001 |
| JP | 2001-026560 | A | 1/2001 |
| JP | 2001011458 | A | 1/2001 |
| JP | 2003-183656 | A | 7/2003 |
| JP | 2005-232214 | A | 9/2005 |
| JP | 2005-250223 | A | 9/2005 |
| JP | 2007-23071 | A | 2/2007 |
| JP | 2007-503487 | A | 2/2007 |
| JP | 2007-177241 | A | 7/2007 |
| JP | 2007-277127 | A | 10/2007 |
| JP | 2008-222588 | A | 9/2008 |
| JP | 2009-215556 | A | 9/2009 |
| JP | 2011-37998 | A | 2/2011 |
| JP | 2011-148761 | A | 8/2011 |
| JP | 2011-168530 | A | 9/2011 |
| JP | 2011-195587 | A | 10/2011 |
| JP | 5263461 | B2 | 8/2013 |
| KR | 10-2006-0119879 | A | 11/2006 |
| WO | 96/32365 | A1 | 10/1996 |
| WO | 98/23564 | A1 | 6/1998 |
| WO | 2009/150963 | A1 | 12/2009 |
| WO | 2012/043387 | A1 | 4/2012 |
| WO | 2012100809 | A1 | 8/2012 |
| WO | 2012/161178 | A1 | 11/2012 |
| WO | 2013/018796 | A1 | 2/2013 |
| WO | 2014/030481 | A1 | 2/2014 |

OTHER PUBLICATIONS

Written Opinion of the International Searching Authority dated Sep. 17, 2013, issued in corresponding application No. PCT/JP2013/070057.

International Search Report of PCT/JP2012/069461, dated Sep. 18, 2012, counterpart to U.S. Appl. No. 14/236,547.

Office Action dated Jan. 21, 2014, issued in Japanese Application No. 2013-553696, w/English translation (4 pages), counterpart to U.S. Appl. No. 14/436,181.

Decision to Grant a Patent dated Apr. 1, 2014, issued in Japanese Application No. 2013-553696, w/English translation (3 pages), counterpart to U.S. Appl. No. 14/436,181.

International Search Report dated Oct. 22, 2013, issued in International Application No. PCT/JP2013/073968, counterpart of U.S. Appl. No. 14/436,213.

International Search Report dated Oct. 23, 2013, issued in International Application No. PCT/JP2013/073967 (2 pages), counterpart to U.S. Appl. No. 14/436,181.

German Office Action dated Nov. 26, 2015, issued in German Patent Application No. 11 2013 005 035.8, with English translation (10 pages), counterpart of U.S. Appl. No. 14/436,213.

German Office Action dated Nov. 27, 2015, issued in German Patent Application No. 11 2013 005 036.6, with English translation (10 pages), counterpart of U.S. Appl. No. 14/436,181.

Decision to Grant a Patent dated Apr. 1, 2014, issued in Japanese Application No. 2013/553697, w/English translation (3 pages), counterpart of U.S. Appl. No. 14/436,213.

Written Opinion of the International Searching Authority dated Sep. 17, 2013 issued in counterpart Application No. PCT/JP2013/070058.

International Search Report dated Sep. 17, 2013 issued in corresponding application No. PCT/JP2013/070058.

International Search Report dated Sep. 17, 2013, issued in application No. PCT/JP2013/070057, counterpart to U.S. Appl. No. 14/419,308 (5 pages).

Written Opinion of the International Searching Authority dated Sep. 17, 2013, issued in application No. PCT/JP2013/070057, counterpart to U.S. Appl. No. 14/419,308 (7 pages).

English Translation of DE102010015824.

English Translation of JP2001011458.

Notification of Reasons for Refusal dated Jan. 21, 2014, issued in corresponding Japanese Application No. 2013-553697, w/English translation (4 pages).

International Search Report dated Nov. 26, 2013, issued in corresponding Application No. PCT/JP2013/073127.

International Search Report dated Nov. 26, 2013, issued in corresponding Application No. PCT/JP2012/069461.

Notice of Allowance dated Mar. 15, 2016, issued in U.S. Appl. No. 14/221,015 (13 pages).

Notification of Reasons for Refusal dated Jan. 21, 2014, issued in corresponding Japanese Application No. 2013-553696, w/English translation (4 pages).

Non Final Office Action dated Jul. 30, 2015, issued in U.S. Appl. No. 14/421,015.

Final Office Action dated Dec. 3, 2016, issued in U.S. Appl. No. 14/421,015.

Non Final Office Action dated Apr. 21, 2016, issued in U.S. Appl. No. 14/421,015.

Final Office Action dated Aug. 3, 2016, issued in U.S. Appl. No. 14/421,015.

Non Final Office Action dated Jan. 14, 2016, issued in U.S. Appl. No. 14/436,181.

Final Office Action dated Jul. 26, 2016, issued in U.S. Appl. No. 14/436,181.

Non Final Office Action dated Jan. 20, 2016, issued in U.S. Appl. No. 14/436,213.

Final Office Action dated Aug. 1, 2016, issued in U.S. Appl. No. 14/436,213.

Non Final Office Action dated Aug. 20, 2015, issued in U.S. Pat. No. 9,321,961.

Notice of Allowance dated Jan. 4, 2016, issued in U.S. Pat. No. 9,321,961.

Notice of Allowance dated Mar. 3, 2015, issued in U.S. Pat. No. 9,039,929.

(56) References Cited

OTHER PUBLICATIONS

Non Final Office Action Sep. 5, 2014m issued in U.S. Pat. No. 9,039,929.
Final Office Action dated Nov. 19, 2014, issued in U.S. Pat. No. 9,039,929.

* cited by examiner

NEMATIC LIQUID CRYSTAL COMPOSITION

TECHNICAL FIELD

The present invention relates to a nematic liquid crystal composition useful as an electro-optic liquid crystal display material and having positive dielectric anisotropy ($\Delta\varepsilon$).

BACKGROUND ART

Liquid crystal display devices are being used in watches, calculators, various measurement instruments, automobile panels, word processors, electronic organizers, printers, computers, televisions, clocks, advertising boards, etc. Typical examples of the liquid crystal display mode include TN (twisted nematic) mode, STN (super twisted nematic) mode, a VA mode featuring vertical alignment using TFTs (thin film transistors), and an IPS (in-plane switching) mode/FFS mode featuring horizontal alignment. Liquid crystal compositions used in these liquid crystal display devices are required to be stable against external factors such as moisture, air, heat, and light, stay in a liquid crystal phase in a temperature range as wide as possible centered around room temperature, exhibit low viscosity, and operate at a low drive voltage. A liquid crystal composition is composed of several to dozens of compounds in order to optimize the dielectric anisotropy ($\Delta\varepsilon$), refractive index anisotropy ($\Delta n$), and/or other properties for individual display devices.

A vertical alignment-mode display uses a liquid crystal composition having a negative $\Delta\varepsilon$. A horizontal alignment-mode display such as a TN, STN, or IPS-mode display uses a liquid crystal composition having a positive $\Delta\varepsilon$. In recent years, a drive mode with which a liquid crystal composition having a positive $\Delta\varepsilon$ is vertically aligned under absence of applied voltage and an image is displayed by applying an IPS/FFS-mode electric field has been reported and the necessity for a liquid crystal composition having a positive $\Delta\varepsilon$ is increasing. Meanwhile, low-voltage driving, high-speed response, and wide operation temperature range are required in all driving modes. In other words, $\Delta\varepsilon$ that is positive and has a large absolute value, a low viscosity ($\eta$), and a high nematic phase-isotropic liquid phase transition temperature ($T_{ni}$) are desirable. Moreover, due to the setting of $\Delta n \times d$, which is the product of $\Delta n$ and a cell gap (d), it is necessary to adjust the $\Delta n$ of the liquid crystal composition to be within an appropriate range according to the cell gap. In addition, since high-speed response is important in applying a liquid crystal display device to a television or the like, a liquid crystal composition with a small $\gamma_1$ is required.

Liquid crystal compositions that use a compound having a positive $\Delta\varepsilon$ and represented by formula (A-1) or (A-2) as a constitutional component of a liquid crystal composition have been disclosed (PTL 1 to PTL 4). However, these liquid crystal compositions do not achieve sufficiently low viscosity.

[Chem. 1]

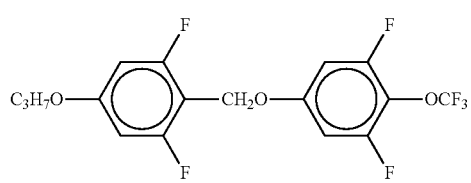

(A-1)

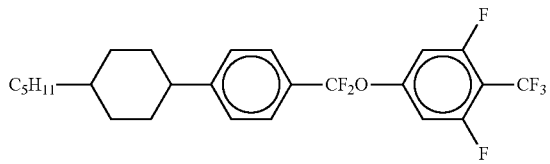

(A-2)

CITATION LIST

Patent Literature

PTL 1: WO96/032365
PTL 2: Japanese Unexamined Patent Application Publication No. 09-157202
PTL 3: WO98/023564
PTL 4: Japanese Unexamined Patent Application Publication No. 2003-183656

SUMMARY OF INVENTION

Technical Problem

An object of the present invention is to provide a liquid crystal composition that has refractive index anisotropy ($\Delta n$) adjusted to a desired level and a positive dielectric anisotropy ($\Delta\varepsilon$) and exhibits sufficiently low viscosity ($\eta$) without degrading the nematic phase temperature range by suppressing the decrease in the nematic phase-isotropic liquid phase transition temperature ($T_{ni}$) and the increase in lower limit temperature of the nematic phase.

Solution to Problem

The inventors of the present invention have studied various fluorobenzene derivatives and found that the object can be achieved by combining specific compounds. Thus, the present invention has been made.

The present invention provides a liquid crystal composition having a positive dielectric anisotropy and containing one or more compounds selected from compounds represented by general formula (LC0) and one or more compounds selected from a group of compounds represented by general formula (LC1) to general formula (LC5), wherein the liquid crystal composition contains one or more compounds in which at least one of $A^{01}$, $A^{02}$, and $A^{11}$ to $A^{42}$ in general formulae (LC0) to (LC4) represents a tetrahydropyran-2,5-diyl group:

[Chem. 2]

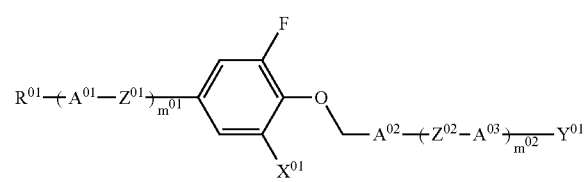

(LC0)

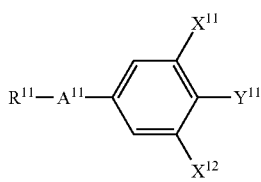
(LC1)

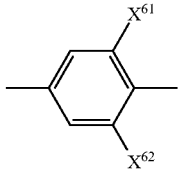
(LC2)

$$R^{21}-A^{21}-A^{22}-(A^{23})_{m^{21}}-\text{ring}-Y^{21}, X^{21}, X^{22}$$

(LC3)

$$R^{31}-(A^{31}-Z^{31})_{m^{31}}-\text{ring}-(Z^{32}-A^{32})_{m^{32}}-Y^{31}, X^{31}, X^{32}$$

(LC4)

$$R^{41}-(A^{41}-Z^{41})_{m^{41}}-\text{naphthalene}-(Z^{42}-A^{42})_{m^{32}}-Y^{41}, X^{41}, X^{42}, X^{43}$$

(LC5)

$$R^{51}-A^{51}-Z^{51}-(A^{52}-Z^{52})_{m^{51}}-A^{53}-R^{52}$$

(In the formulae, $R^{01}$ to $R^{41}$ each independently represent an alkyl group having 1 to 15 carbon atoms where one or more —$CH_2$— in the alkyl group may each be substituted with —O—, —CH=CH—, —CO—, —OCO—, —COO—, —C≡C—, —$CF_2O$—, or —$OCF_2$— so long as oxygen atoms are not directly adjacent to each other and one or more hydrogen atoms in the alkyl group may each be substituted with a halogen; $R^{51}$ and $R^{52}$ each independently represent an alkyl group having 1 to 15 carbon atoms where one or more —$CH_2$— in the alkyl group may each be substituted with —O—, —CH=CH—, —CO—, —OCO—, —COO—, or —C≡C— so long as oxygen atoms are not directly adjacent to each other, and may each represent —$OCF_3$ or —$CF_3$— when $A^{51}$ or $A^{53}$ described below represents a cyclohexane ring; $A^{01}$ to $A^{42}$ each independently represent any one of structures below:

[Chem. 3]

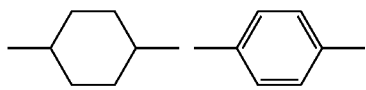

(In the structures, one or more —$CH_2$— in the cyclohexane ring may each be substituted with —O— so long as oxygen atoms are not directly adjacent to each other; in the structures, one or more —CH= in the benzene ring may each be substituted with —N= so long as nitrogen atoms are not directly adjacent to each other; and $X^{61}$ and $X^{62}$ each independently represent —H, —Cl, —F, —$CF_3$, or —$OCF_3$); $A^{51}$ to $A^{53}$ each independently represent any one of structures below:

[Chem. 4]

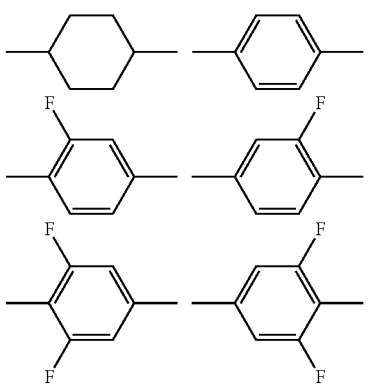

(In the formulae, one or more —$CH_2CH_2$— in the cyclohexane ring may each be substituted with —CH=CH—, —$CF_2O$—, or —$OCF_2$— and one or more —CH= in the benzene ring may each be substituted with —N= so long as nitrogen atoms are not directly adjacent to each other); $X^{01}$ represents a hydrogen atom or a fluorine atom; $X^{11}$ to $X^{43}$ each independently represent —H, —Cl, —F, —$CF_3$, or —$OCF_3$; Y each $Y^{01}$ to $Y^{41}$ represent —Cl, —F, —$OCHF_2$, —$CF_3$, or —$OCF_2$; $Z^{01}$ and $Z^{02}$ each independently represent a single bond, —CH=CH—, —C≡C—, —$CH_2CH_2$—, —$(CH_2)_4$—, —$OCF_2$—, or —$CF_2O$—; $Z^{31}$ to $Z^{42}$ each independently represent a single bond, —CH=CH—, —C≡C—, —$CH_2CH_2$—, —$(CH_2)_4$—, —$OCF_2$—, or —$CF_2O$— where at least one of $Z^{31}$ and $Z^{32}$ that are present represents a group other than a single bond; $Z^{51}$ and $Z^{52}$ each independently represent a single bond, —CH=CH—, —C≡C—, —$CH_2CH_2$—, —$(CH_2)_4$—, —$OCH_2$—, —$CH_2O$—, —$OCF_2$— or —$CF_2O$—; $m^{01}$ to $m^{51}$ each independently represent an integer of 0 to 3; $m^{01}+m^{02}$, $m^{31}+m^{32}$, and $m^{41}+m^{42}$ are each independently 1, 2, 3, or 4; and when a plurality of $A^{01}$, $A^{03}$, $A^{23}$, $A^{31}$, $A^{32}$, $A^{41}$, $A^{42}$, $A^{52}$, $Z^{01}$, $Z^{02}$, $Z^{31}$, $Z^{32}$, $Z^{41}$, $Z^{42}$, and/or $Z^{52}$ are present, they may be the same or different).

Advantageous Effects of Invention

The liquid crystal composition according to the present invention features a positive Δ∈ having a large absolute value. Moreover, η is low, the rotational viscosity ($γ_1$) is small, the liquid crystal properties are excellent, and a stable liquid crystal phase is achieved over a wide temperature range. Moreover, the liquid crystal composition is chemically stable against heat, light, water, etc., can be driven at a low voltage, is practical, and has high reliability.

DESCRIPTION OF EMBODIMENTS

A liquid crystal composition according to the invention of the present application contains one or more compounds selected from compounds represented by general formula (LC0) above and one or more compounds selected from a compound group consisting of compounds represented by general formulae (LC1) to (LC5). Since a liquid crystal composition containing compounds represented by general formula (LC0) and compounds represented by general formulae (LC1) to (LC5) exhibits a stable liquid crystal phase even at low temperature, the liquid crystal composition can be regarded as a practical liquid crystal composition.

In general formulae (LC0) to (LC5), $R^{01}$ to $R^{52}$ preferably each independently represent an alkyl group having 1 to 8 carbon atoms, an alkenyl group having 2 to 8 carbon atoms, or an alkoxy group having 1 to 8 carbon atoms and are preferably linear. When $R^{01}$ to $R^{52}$ are to represent alkenyl groups, selection is preferably made from groups represented by formulae (R1) to (R5):

[Chem. 5]

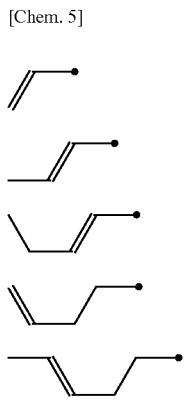

(R1)
(R2)
(R3)
(R4)
(R5)

(In each formula, the black dot represents a bonding point to a ring.)

In the case where $A^{01}$, $A^{01}$, $A^{21}$, $A^{31}$, $A^{41}$, $A^{51}$, and $A^{53}$ each represent a trans-1,4-cyclohexylene group, groups represented by formulae (R1), (R2), and (R4) are more preferable. It is yet more preferable to contain one or more compounds represented by general formula (LC5) in which at least one selected from $R^{51}$ and $R^{53}$ represents an alkenyl group represented by a formula selected from formulae (R1) to (R5). $A^{01}$ to $A^{42}$ preferably each independently represent a trans-1,4-cyclohexylene group, a 1,4-phenylene group, a 3-fluoro-1,4-phenylene group, a 3,5-difluoro-1,4-phenylene group, or a tetrahydropyran-2,5-diyl group. In the case where some of $A^{01}$ to $A^{42}$ are to represent a tetrahydropyran-2,5-diyl group, $A^{01}$, $A^{11}$, $A^{21}$, $A^{31}$, and $A^{41}$ preferably represent this group. Examples of preferable compounds containing a tetrahydropyran-2,5-diyl group include compounds represented by general formula (LC0-7) to general formula (LC0-9), general formula (LC0-23), general formula (LC0-24), general formula (LC0-26), general formula (LC0-27), general formula (LC0-20), general formula (LC0-40), general formula (LC0-51) to general formula (LC0-53), general formula (LC0-110), general formula (LC0-111), general formula (LC2-9) to general formula (LC2-14), general formula (LC3-23) to general formula (LC3-32), general formula (LC4-12) to general formula (LC4-14), general formula (LC4-16), general formula (LC4-19), and general formula (LC4-22). In such a case, at least one compound selected from this compound group is more preferably contained in order to achieve the object of the present invention.

$A^{51}$ to $A^{53}$ preferably each independently represent a trans-1,4-cyclohexylene group, a 1,4-phenylene group, a 3-fluoro-1,4-phenylene group, or a 2-fluoro-1,4-phenylene group.

$Z^{01}$ and $Z^{02}$ preferably each independently represent a single bond, —CH=CH—, —C≡C—, —CH$_2$CH$_2$—, —OCF$_2$—, or —CF$_2$O—. In the case where one of $Z^{01}$ and $Z^{02}$ that are present represents —CH=CH—, —C≡C—, —CH$_2$CH$_2$—, —(CH$_2$)$_4$—, —OCF$_2$—, or —CF$_2$O—, the other preferably represents a single bond. $Z^{01}$ and $Z^{02}$ preferably both represent a single bond.

$Z^{31}$ to $Z^{42}$ preferably each independently represent a single bond, —CH=CH—, —C≡C—, —CH$_2$CH$_2$—, —OCH$_2$—, —CH$_2$O—, —OCF$_2$—, or —CF$_2$O—. In the case where one of $Z^{31}$ to $Z^{42}$ that are present represents —CH=CH—, —C≡C—, —CH$_2$CH$_2$—, —(CH$_2$)$_4$—, —OCF$_2$—, or —CF$_2$O—, the others preferably each represent a single bond.

$Z^{51}$ and $Z^{52}$ preferably each independently represent a single bond, —CH=CH—, —C≡C—, —CH$_2$CH$_2$—, —OCF$_2$—, or —CF$_2$O—. In the case where one of $Z^{51}$ and $Z^{52}$ that are present represents —CH=CH—, —C≡C—, —CH$_2$CH$_2$—, —(CH$_2$)$_4$—, —OCH$_2$—, —CH$_2$O—, —OCF$_2$—, or —CF$_2$O—, the other preferably represents a single bond. More preferably, $Z^{51}$ and $Z^{52}$ both represent a single bond.

$X^{01}$ in general formula (LC0) is preferably F since a significantly low viscosity ($\eta$) is achieved relative to a high dielectric anisotropy ($\Delta\varepsilon$) or the same level of dielectric anisotropy ($\Delta\varepsilon$). $X^{11}$ to $X^{43}$ preferably each independently represent H or F, and $X^{11}$, $X^{21}$, $X^{31}$, and $X^{41}$ preferably each represent F.

$Y^{01}$ to $Y^{41}$ particularly preferably each independently represent F, CF$_3$, or OCF$_3$. While $m^{01}$ to $m^{51}$ may each independently represent an integer of 0 to 23, $m^{01}+m^{02}$ is particularly preferably 1 or 2, $m^{21}$ is particularly preferably 0, $m^{31}+m^{32}$ is particularly preferably 1, 2, or 3, and $m^{41}+m^{42}$ is particularly preferably 1 or 2.

The liquid crystal compound represented by general formula (LC0) is preferably a compound represented by any one of general formula (LC0-a) to (LC0-h) (in the formulae, $R^{01}$, $A^{01}$, $A^{02}$, $A^{03}$, $Z^{01}$, $Z^{02}$, $X^{01}$, and $Y^{01}$ are the same as those in general formula (LC0) and when two or more $A^{01}$ and $A^{03}$, and/or $Z^{01}$ and $Z^{02}$ are present, they may be the same or different).

[Chem. 6]

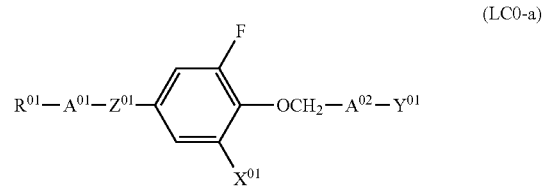

(LC0-a)

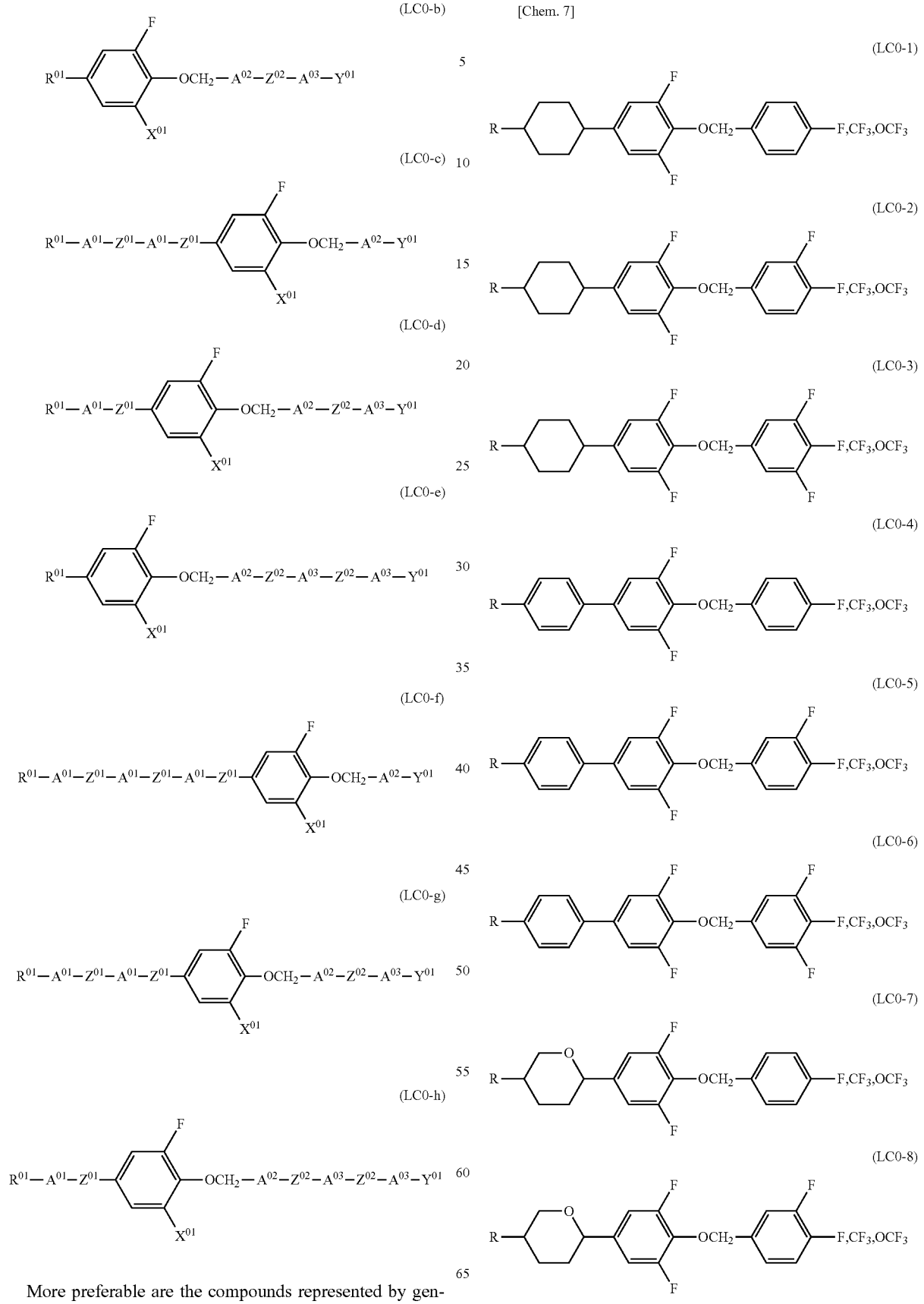
More preferable are the compounds represented by general formula (LC0-1) to general formula (LC0-111) below:

(LC0-9)
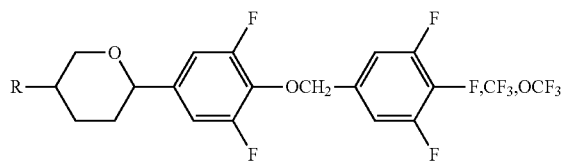
(LC0-10)
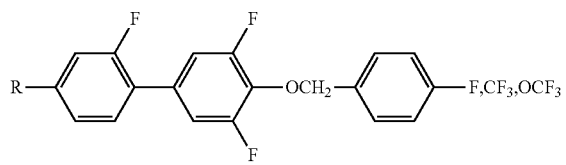
(LC0-11)
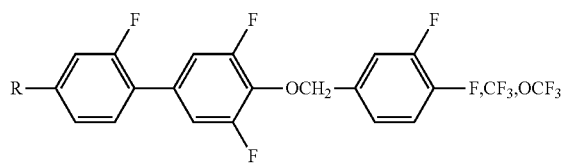
(LC0-12)
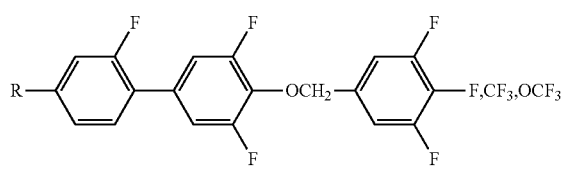
(LC0-13)
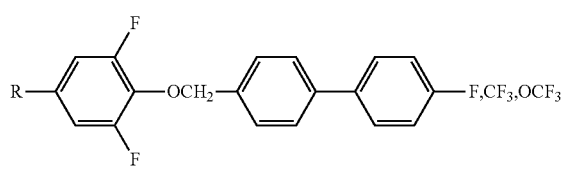
(LC0-14)
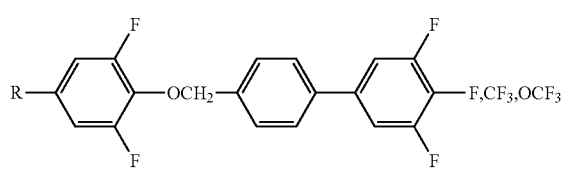
(LC0-15)
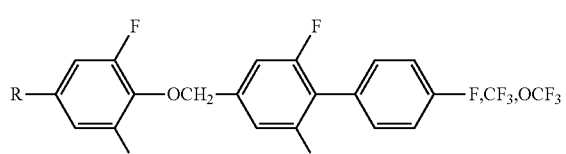
(LC0-16)
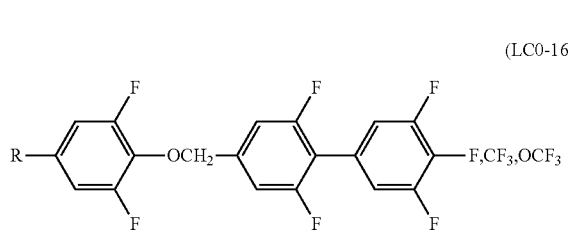
(LC0-17)
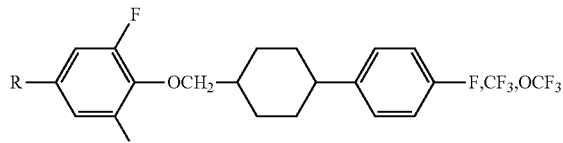
(LC0-18)
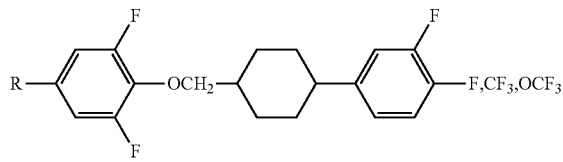
(LC0-19)
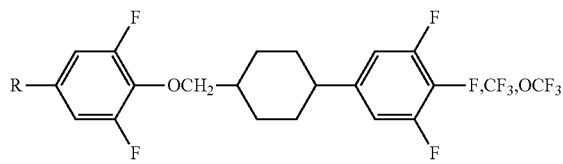
[Chem. 8]
(LC0-20)
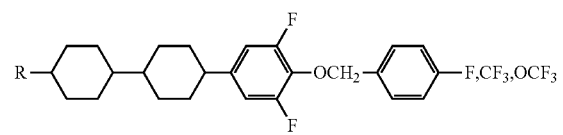
(LC0-21)
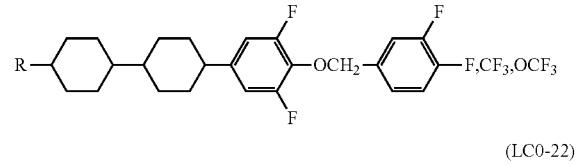
(LC0-22)
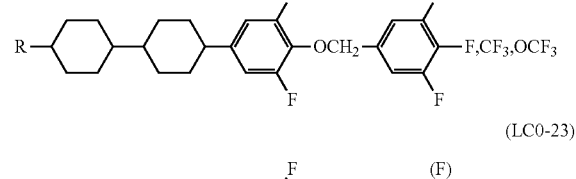
(LC0-23)
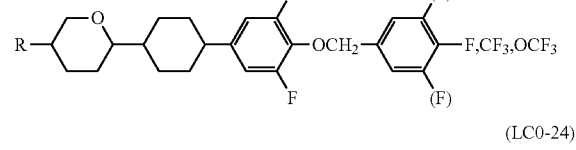
(LC0-24)
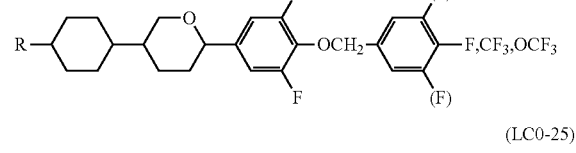
(LC0-25)
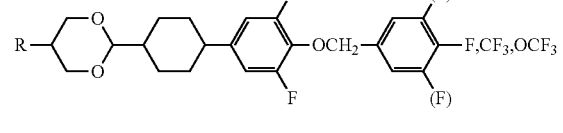

(LC0-26) 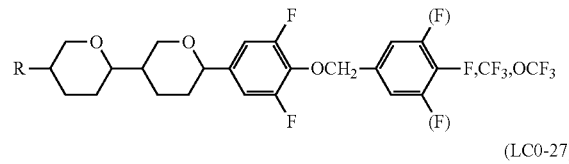
(LC0-27) 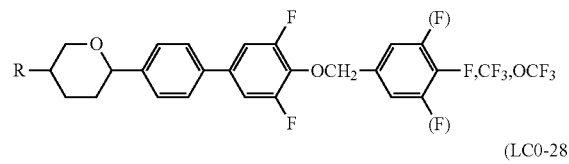
(LC0-28) 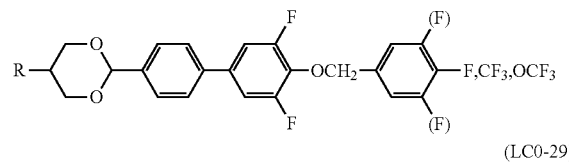
(LC0-29) 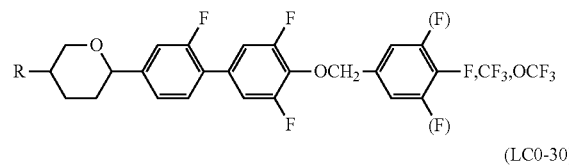
(LC0-30) 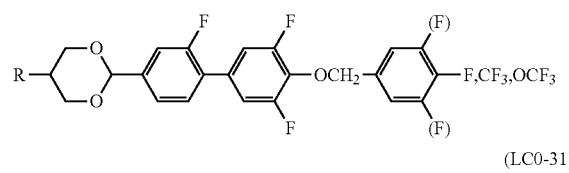
(LC0-31) 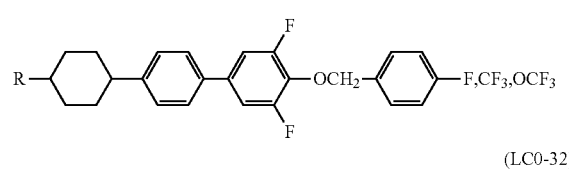
(LC0-32) 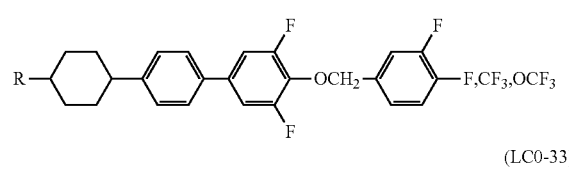
(LC0-33) 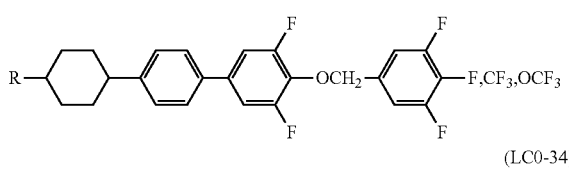
(LC0-34) 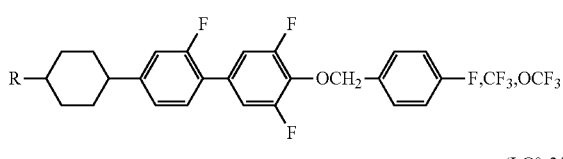
(LC0-35) 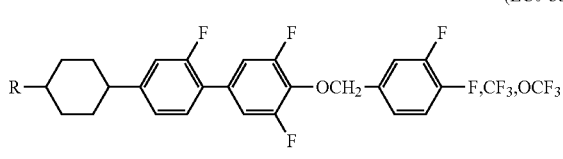
(LC0-36) 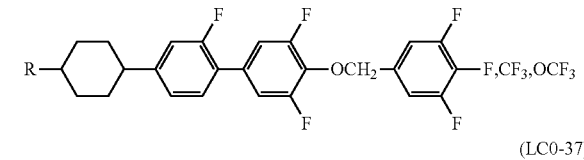
(LC0-37) 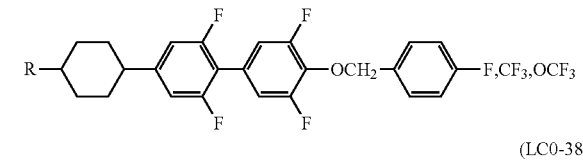
(LC0-38) 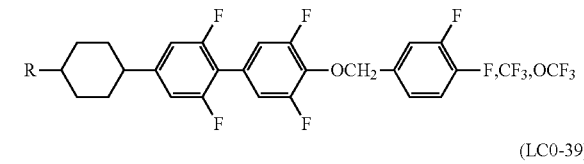
(LC0-39) 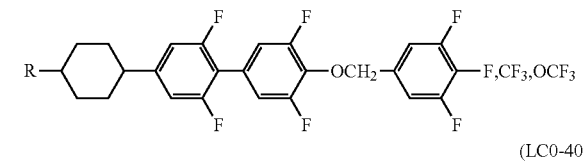
(LC0-40) 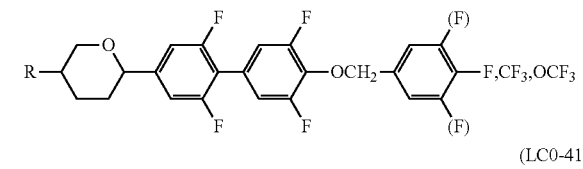
(LC0-41) 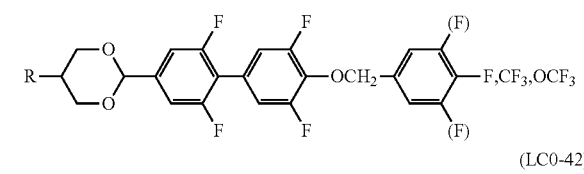
(LC0-42) 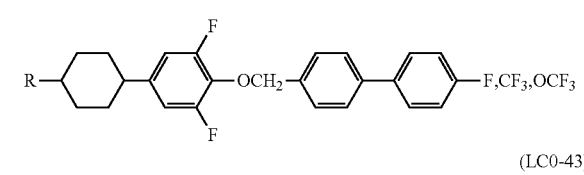
(LC0-43) 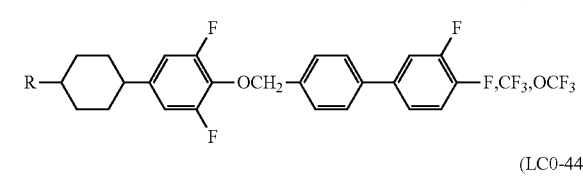
(LC0-44) 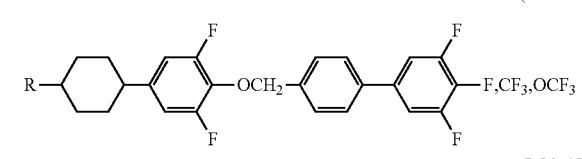
(LC0-45) 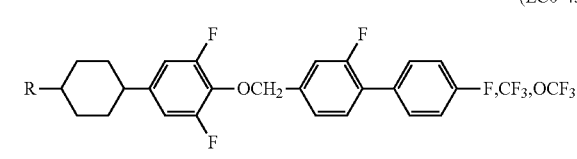

(LC0-46) through (LC0-64): chemical structures (LC0-65) 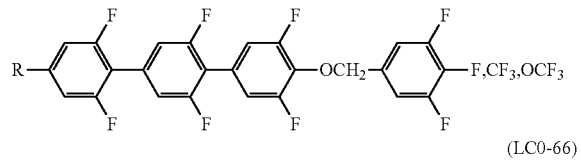
(LC0-66) 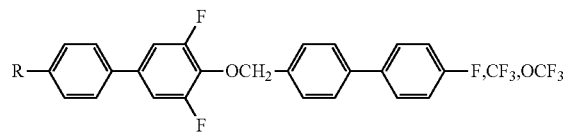
(LC0-67) 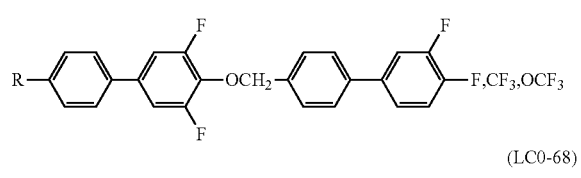
(LC0-68) 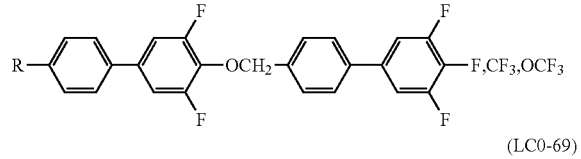
(LC0-69) 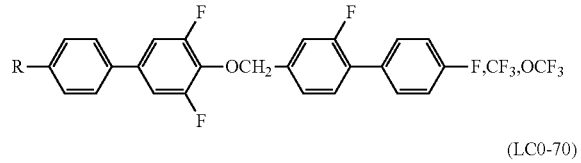
(LC0-70) 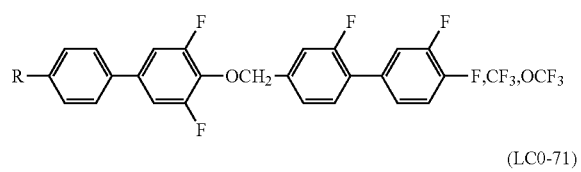
(LC0-71) 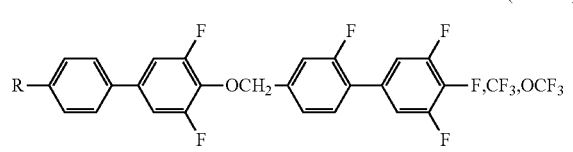
(LC0-72) 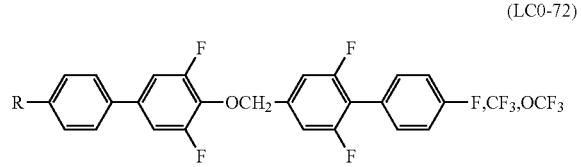
(LC0-73) 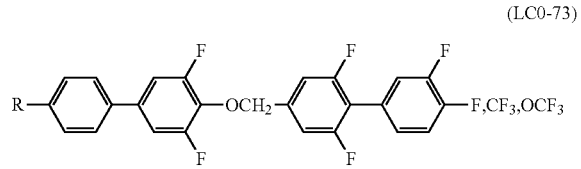
(LC0-74) 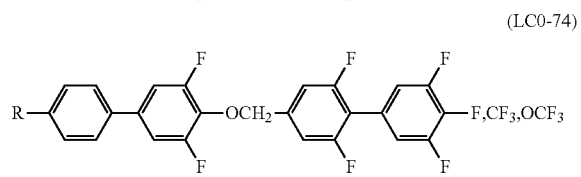
(LC0-75) 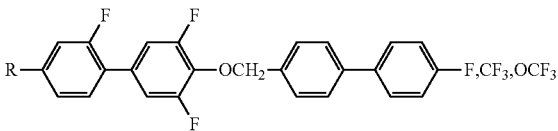
(LC0-76) 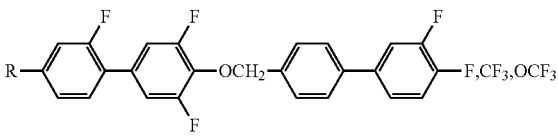
(LC0-77) 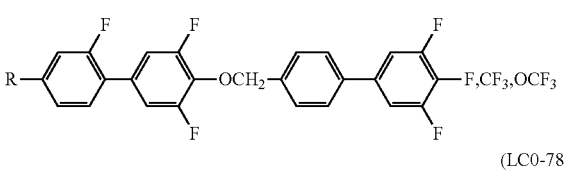
(LC0-78) 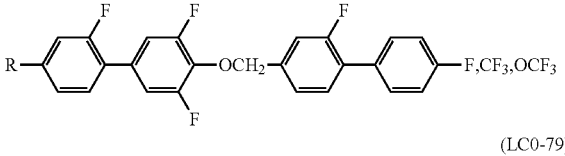
(LC0-79) 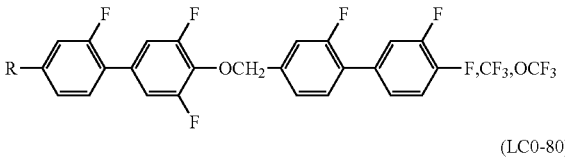
(LC0-80) 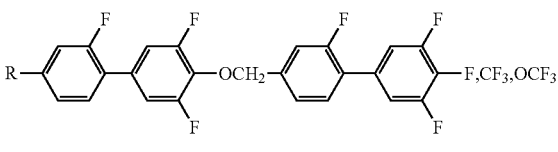
(LC0-81) 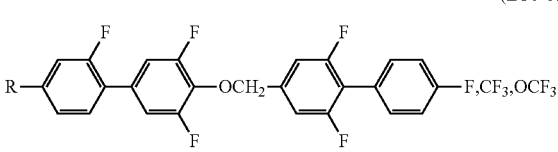
(LC0-82) 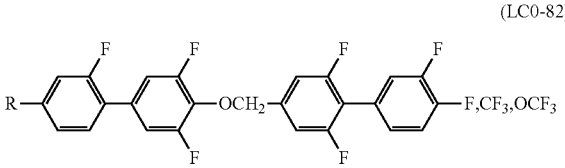
(LC0-83) 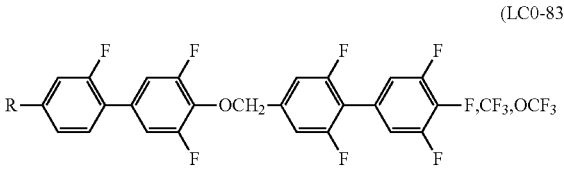
(LC0-84) 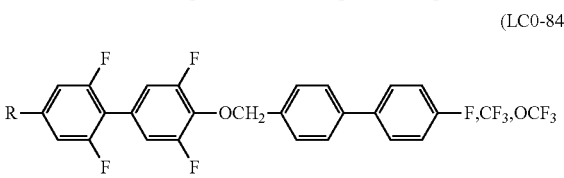

(LC0-85)
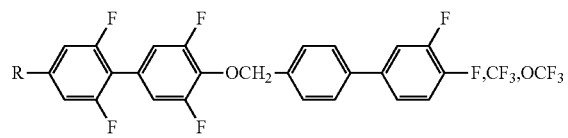
(LC0-86)
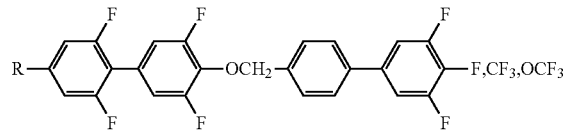
(LC0-87)
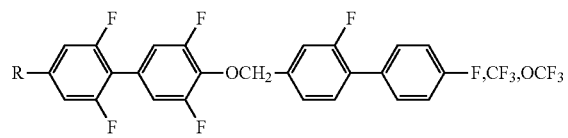
(LC0-88)
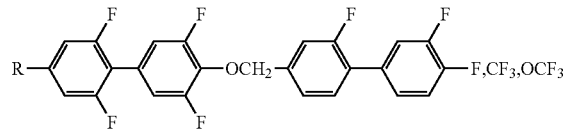
(LC0-89)
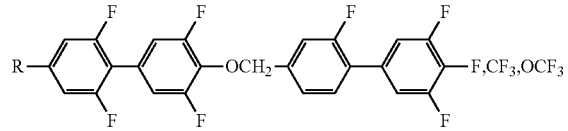
(LC0-90)
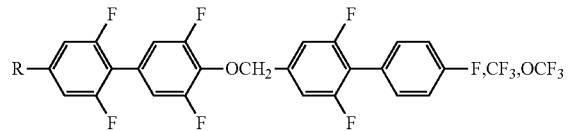
(LC0-91)
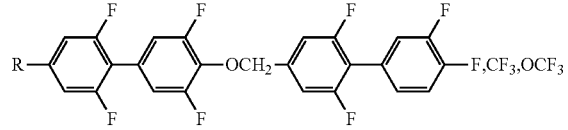
(LC0-92)
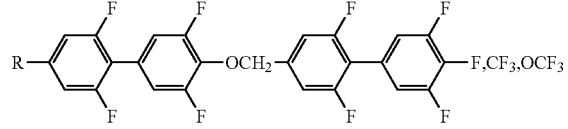
[Chem. 10]
(LC0-93)
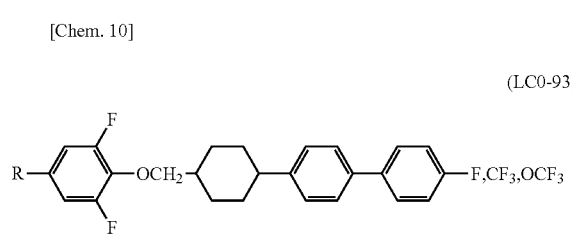
(LC0-94)
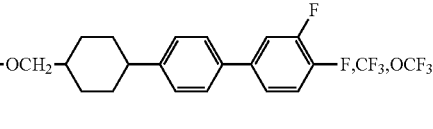
(LC0-95)
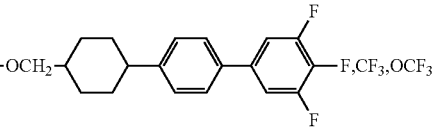
(LC0-96)
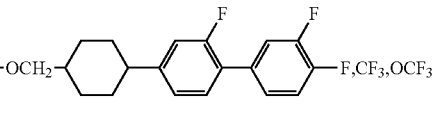
(LC0-97)
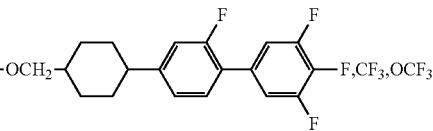
(LC0-98)
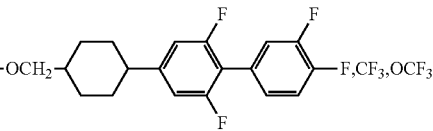
(LC0-99)
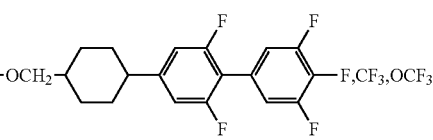
(LC0-100)
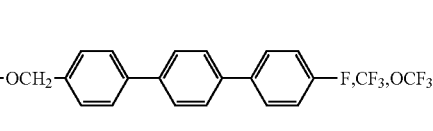
(LC0-101)
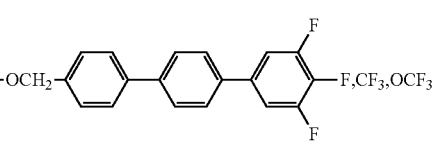
(LC0-102)
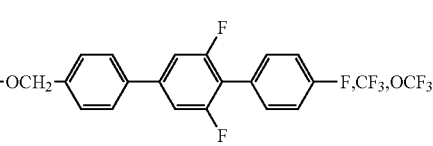
(LC0-103)
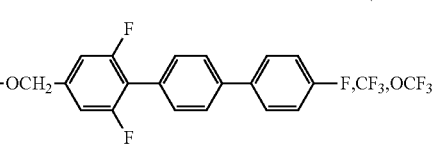

-continued (LC0-104)
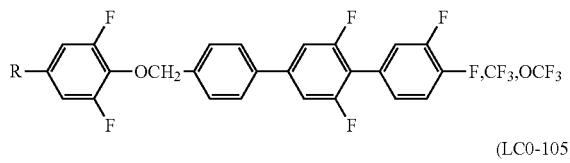

(LC0-105)
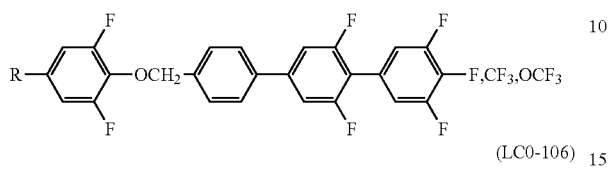

(LC0-106)
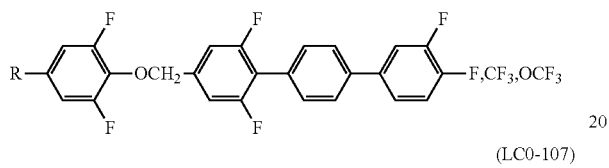

(LC0-107)
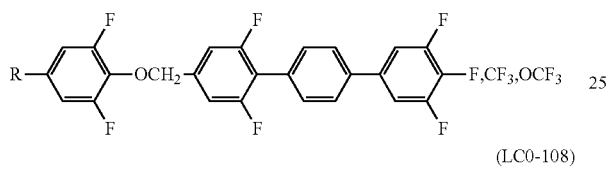

(LC0-108)
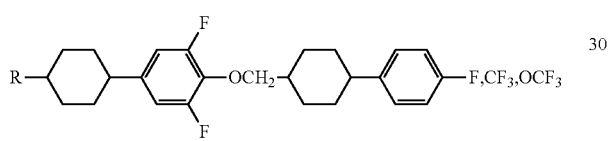

(LC0-109)
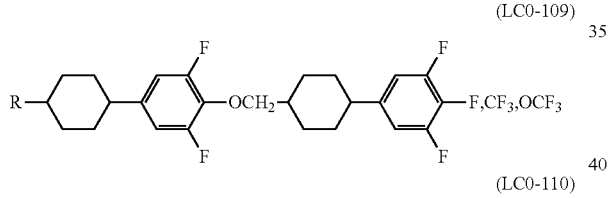

(LC0-110)
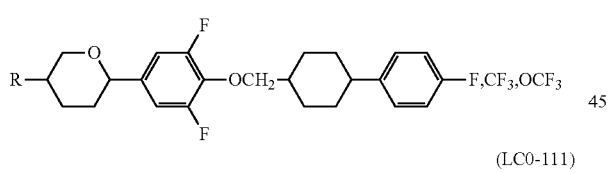

(LC0-111)
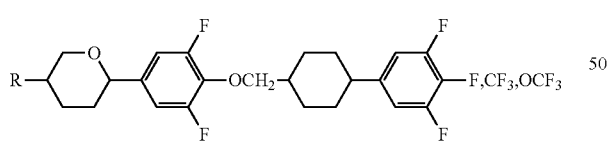

(In the formulae, R is the same as $R^{01}$ in general formula (LC0), "—F, $CF_3$, $OCF_3$" denotes that $Y^{01}$ each independently represent one of —F, $CF_3$, and $OCF_3$, and "(—F)" denotes H or F serving as a substituent.) Compounds represented by general formula (LC0-1) to general formula (LC0-19) are particularly preferable since they have high dielectric anisotropy (Δ∈), notably low viscosity (η), and good compatibility. Compounds represented by general formulae (LC0-20) to general formula (LC0-111) are particularly preferable since they have high dielectric anisotropy (Δ∈), relatively low viscosity (η), and a high nematic phase-isotropic liquid phase transition temperature ($T_{ni}$).

The compounds represented by general formula (LC2) are more preferably compounds represented by general formula (LC2-1) to general formula (LC2-14) below:

[Chem. 11]

(LC2-1)
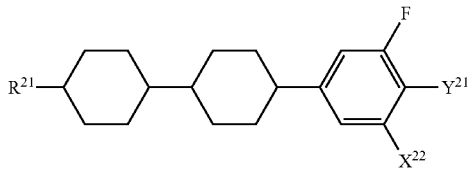

(LC2-2)
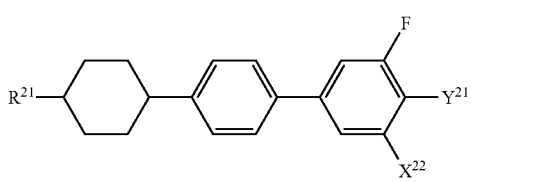

(LC2-3)
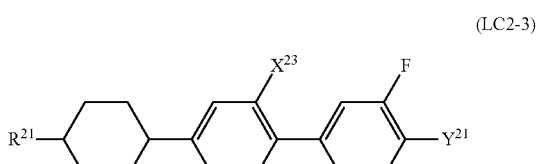

(LC2-4)
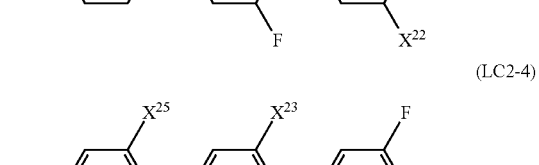

(LC2-5)
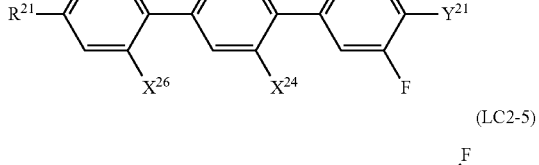

(LC2-6)
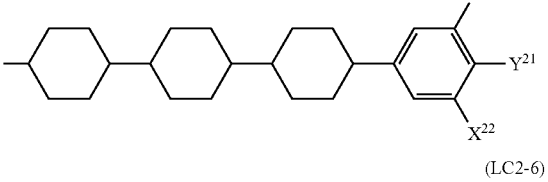

(LC2-7)
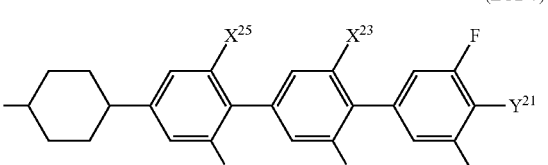

(LC2-8) 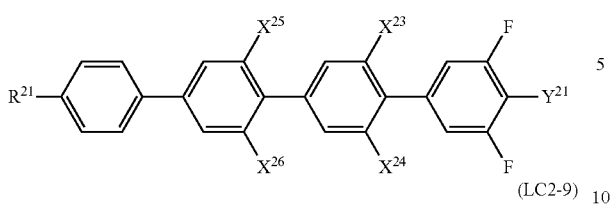

(LC2-9) 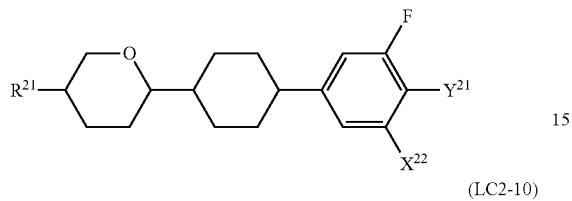

(LC2-10) 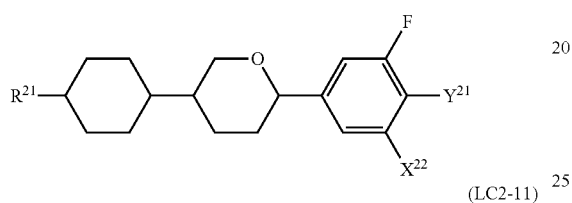

(LC2-11) 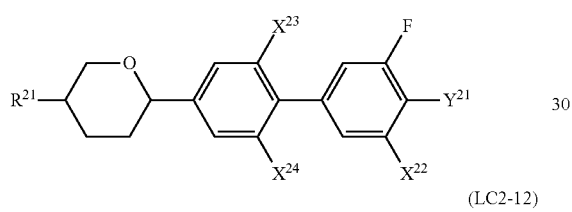

(LC2-12) 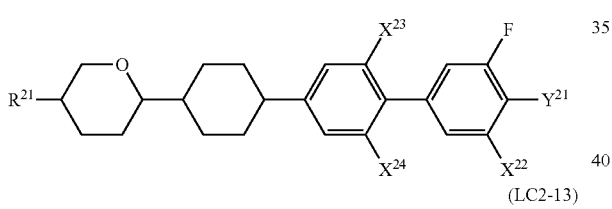

(LC2-13) 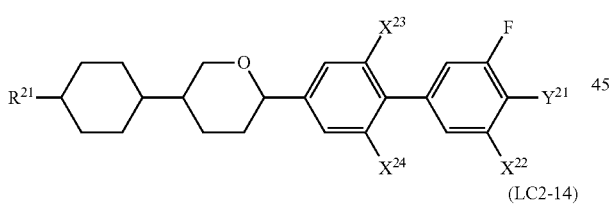

(LC2-14) 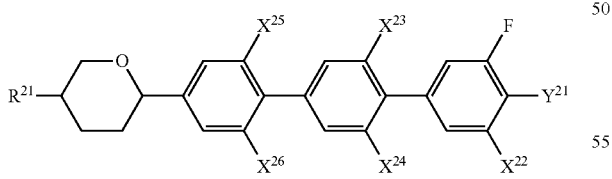

(In the formulae, $X^{23}$, $X^{24}$, $X^{25}$, and $X^{26}$ each independently represent a hydrogen atom, Cl, F, $CF_3$, or $OCF_3$, and $X^{22}$, $R^{21}$, and $Y^{21}$ are the same as those in general formula (LC2)). The group of compounds represented by general formula (LC2-1) to general formula (LC2-4) and general formula (LC2-9) to general formula (LC2-11) is more preferable.

The compounds represented by general formula (LC3) are more preferably compounds represented by general formula (LC3-1) to general formula (LC3-32) below:

[Chem. 12]

(LC3-1) 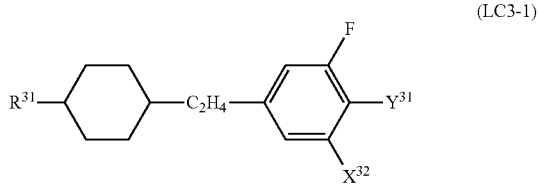

(LC3-2) 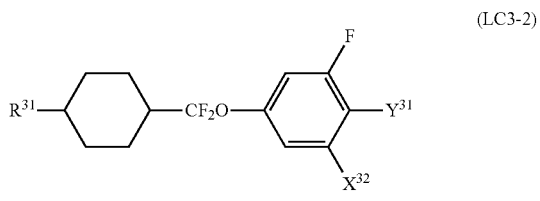

(LC3-3) 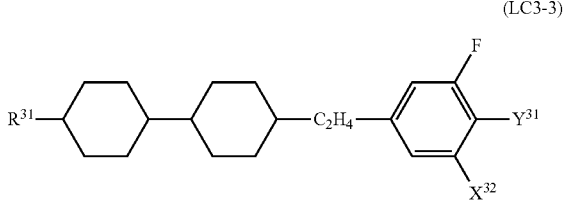

(LC3-4) 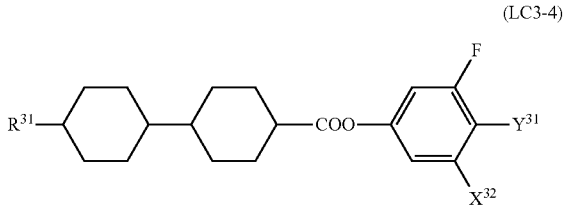

(LC3-5) 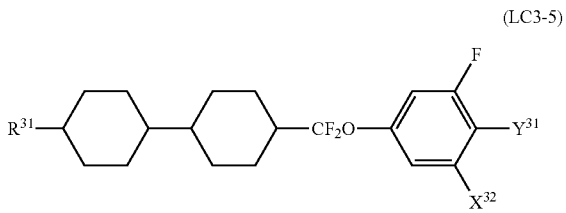

(LC3-6) 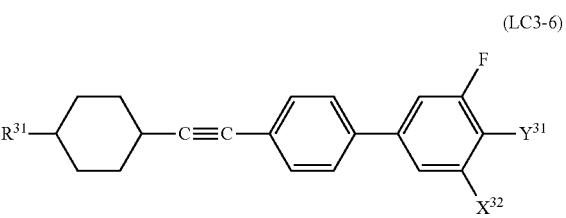

(LC3-7) 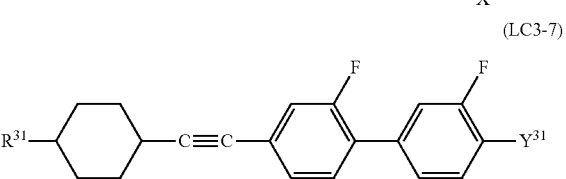

(LC3-8) 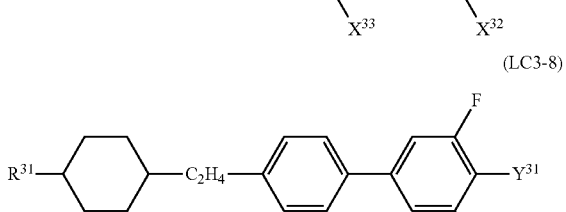

(LC3-9)
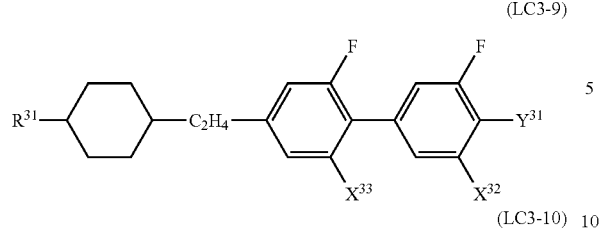
(LC3-10)
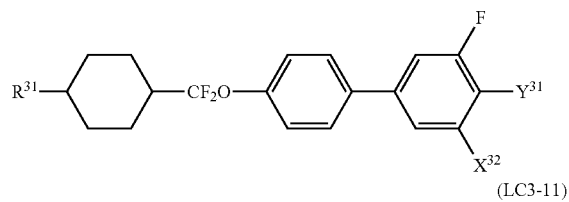
(LC3-11)
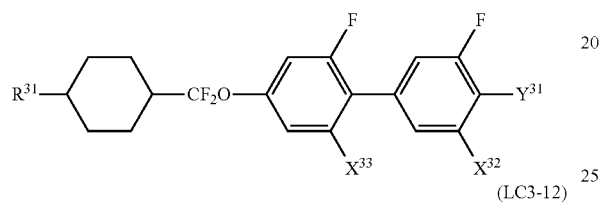
(LC3-12)
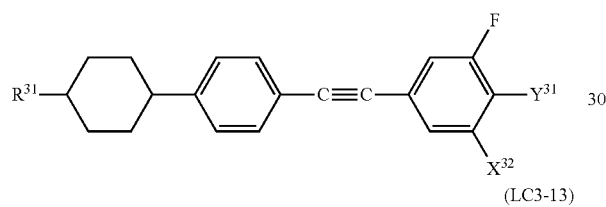
(LC3-13)
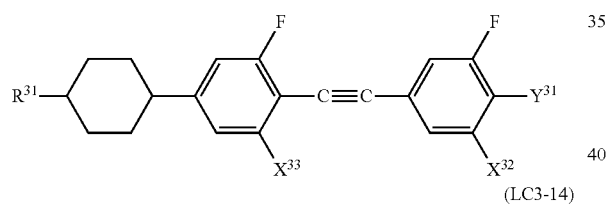
(LC3-14)
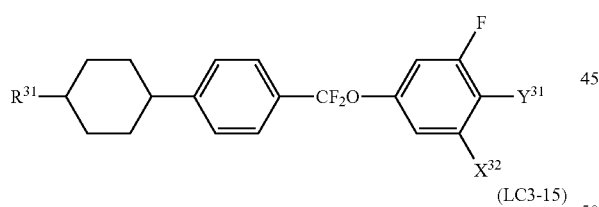
[Chem. 13]
(LC3-16)
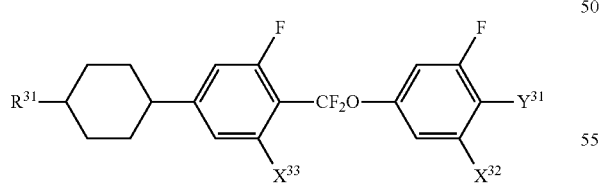
(LC3-17)
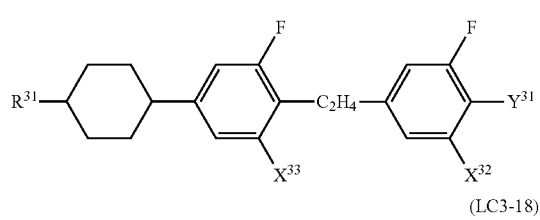
(LC3-18)
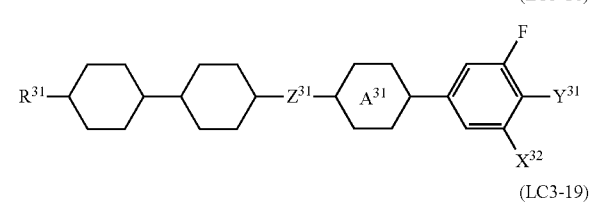
(LC3-19)
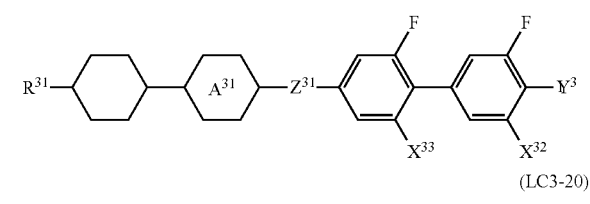
(LC3-20)
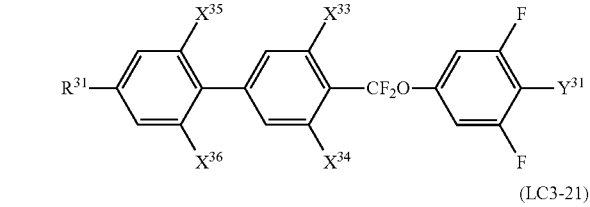
(LC3-21)
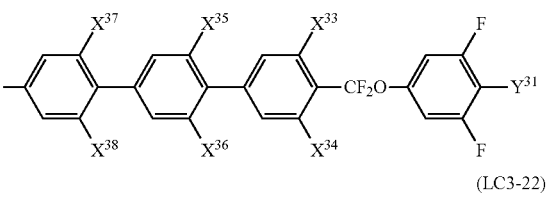
(LC3-22)
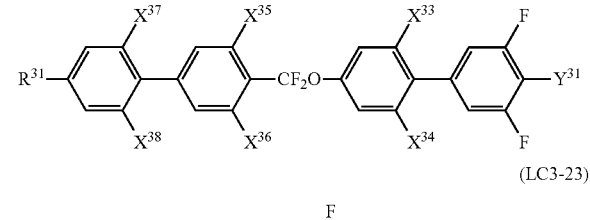
(LC3-23)
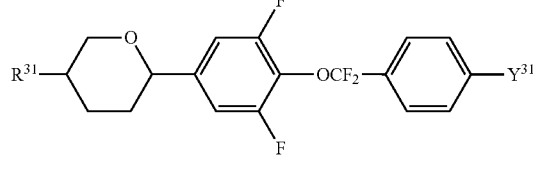
(LC3-24)
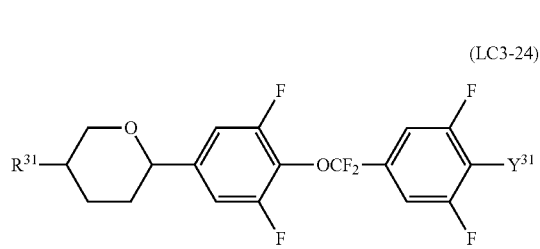

(LC3-25)
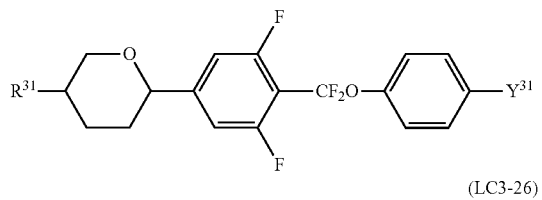

(LC3-26)
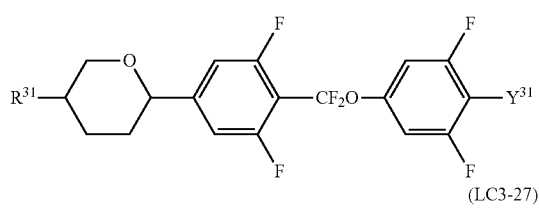

(LC3-27)
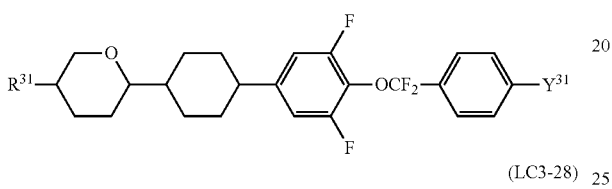

(LC3-28)
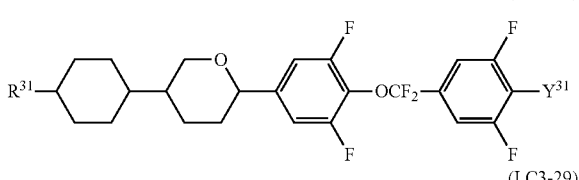

(LC3-29)
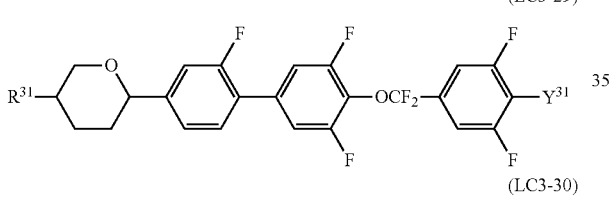

(LC3-30)
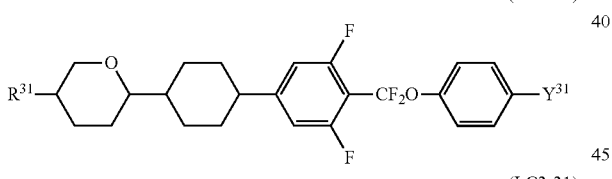

(LC3-31)
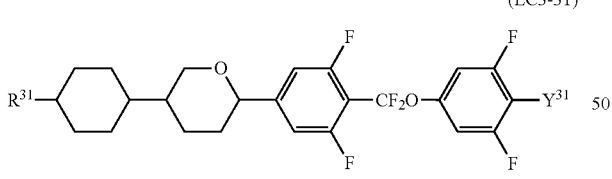

(LC3-32)
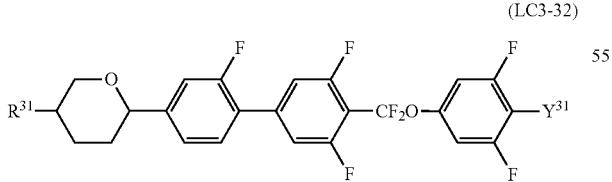

(In the formulae, $X^{33}$, $X^{34}$, $X^{35}$, $X^{36}$, $X^{37}$, and $X^{38}$ each independently represent H, Cl, F, $CF_3$, or $OCF_3$, and $X^{32}$, $R^{31}$, $A^{31}$, $Y^{31}$, and $Z^{31}$ are the same as those in general formula (LC3).) Among these, the group of the compounds represented by general formula (LC3-5), general formula (LC3-15), and general formula (LC3-20) to general formula (LC3-32) is more preferably used in combination with the essential component of the present invention represented by general formula (LC0). More preferably, a compound selected from the group of compounds represented by general formula (LC3-20) and general formula (LC3-21) with $X^{33}$ and $X^{34}$ each representing F and/or the group of tetrahydropyran-ring-containing compounds represented by general formula (LC3-25), general formula (LC3-26), and general formula (LC3-30) to general formula (LC3-32) are preferably used in combination with the essential component of the present invention represented by general formula (LC0).

The compounds represented by general formula (LC4) are more preferably compounds represented by general formula (LC4-1) to general formula (LC4-23) below:

[Chem. 14]

(LC4-1)
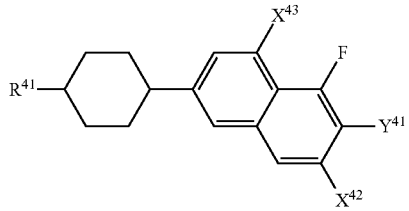

(LC4-2)
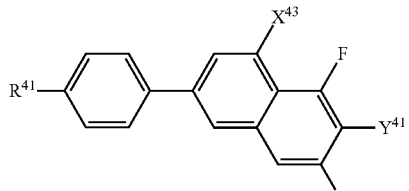

(LC4-3)
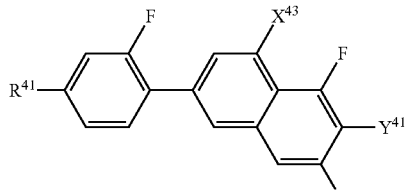

(LC4-4)
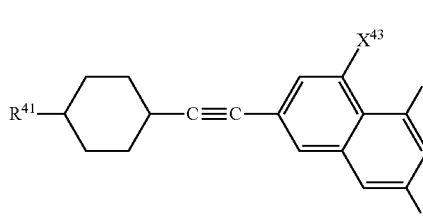

(LC4-5)
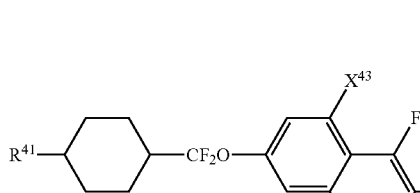

(LC4-6)
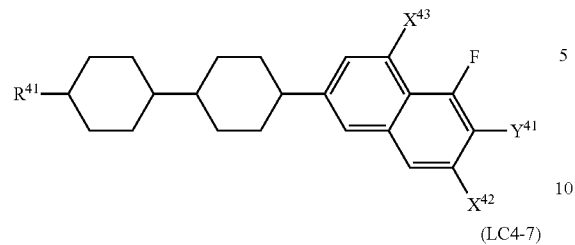
(LC4-7)
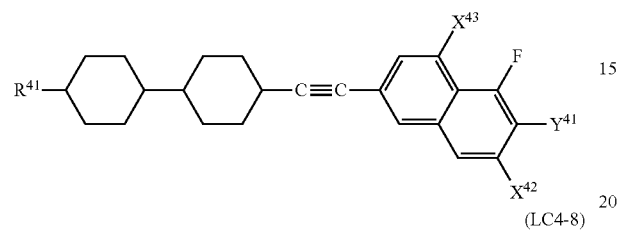
(LC4-8)
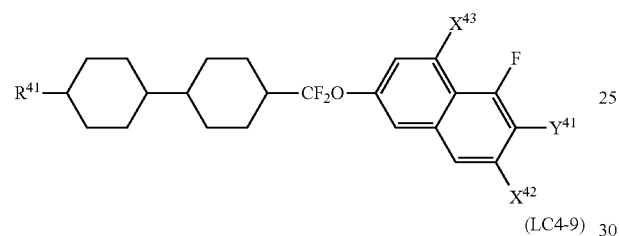
(LC4-9)
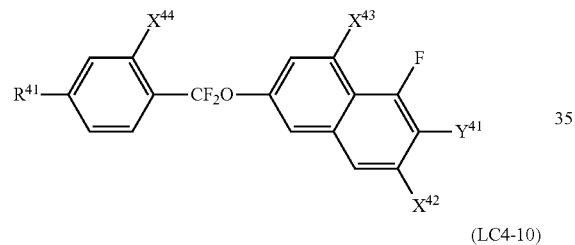
(LC4-10)
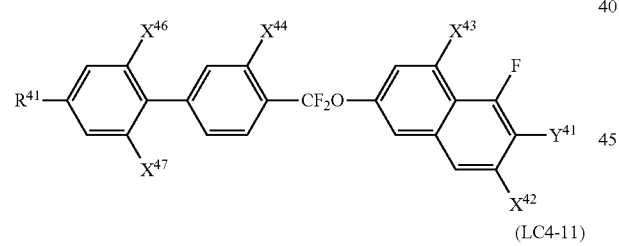
(LC4-11)
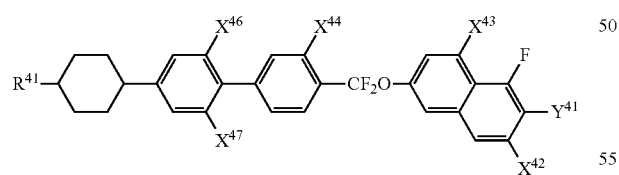
[Chem. 15]
(LC4-12)
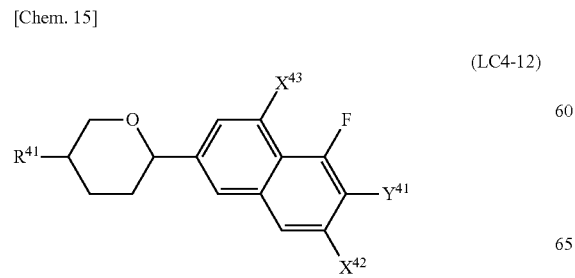
(LC4-13)
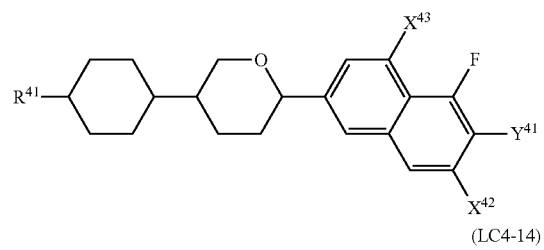
(LC4-14)
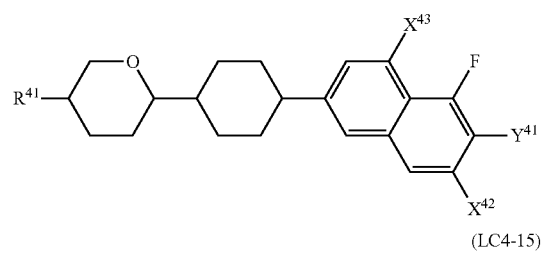
(LC4-15)
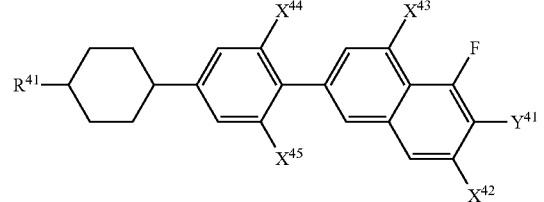
(LC4-16)
(LC4-17)
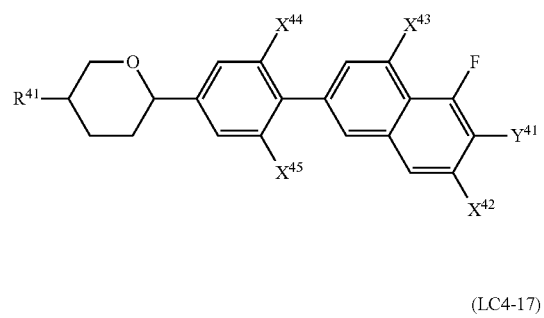
(LC4-18)
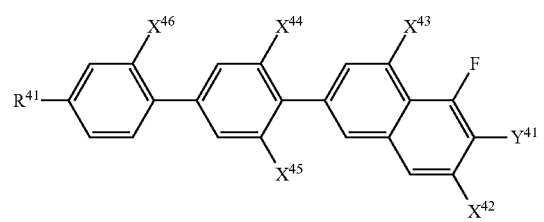

-continued (LC4-19)
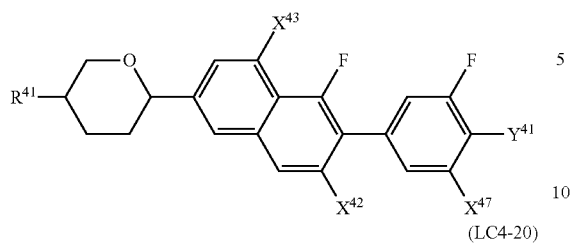

(LC4-20)
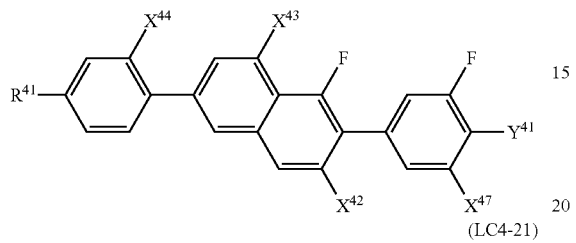

(LC4-21)
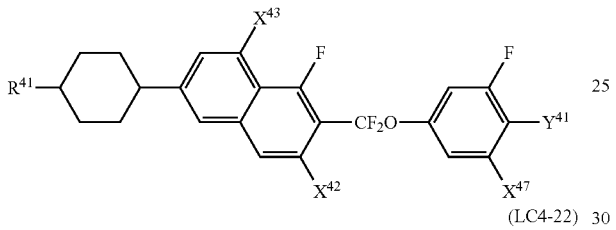

(LC4-22)
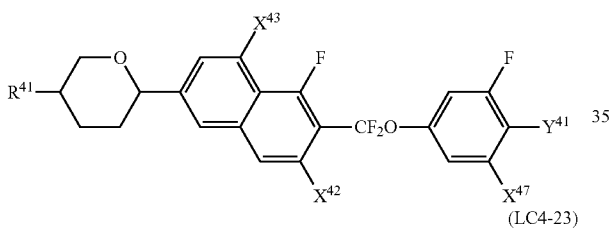

(LC4-23)
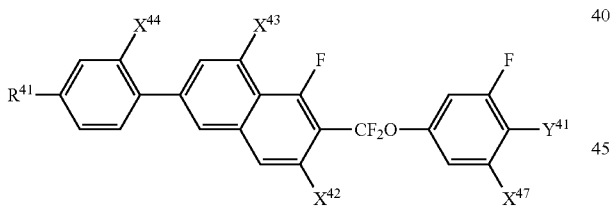

(In the formulae, $X^{44}$, $X^{45}$, $X^{46}$, and $X^{47}$ each independently represent H, Cl, F, $CF_3$, or $OCF_3$, and $X^{42}$, $X^{43}$, $R^{41}$, and $Y^{41}$ are the same as those in general formula (LC4).) Among these, the group of compounds represented by general formula (LC4-1) to general formula (LC4-3), general formula (LC4-6), general formula (LC4-9), general formula (LC4-10), and general formula (LC4-12) to general formula (LC4-17) are more preferably used in combination with the essential component of the present invention represented by general formula (LC0). Furthermore, among these, a compound selected from the group of compounds represented by general formula (LC4-9) to general formula (LC4-11) and general formula (LC4-15) to general formula (LC4-17) with $X^{44}$ and/or $X^{45}$ representing F is more preferably used in combination with the essential component of the present invention represented by general formula (LC0).

The compounds represented by general formula (LC5) are more preferably compounds represented by general formula (LC5-1) to general formula (LC5-26) below:

[Chem. 16]

(LC5-1)
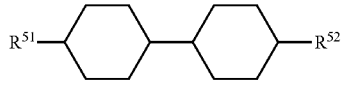

(LC5-2)
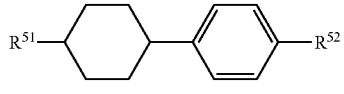

(LC5-3)
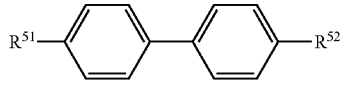

(LC5-4)

(LC5-5)
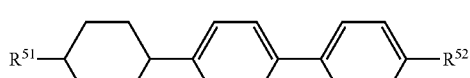

(LC5-6)
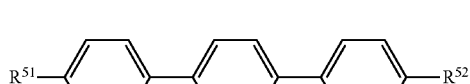

(LC5-7)

(LC5-8)
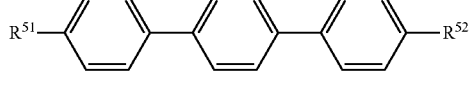

(LC5-9)
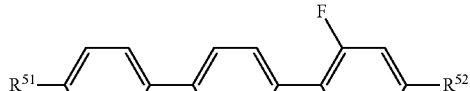

(LC5-10)

(LC5-11)
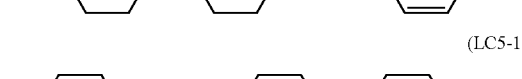

(LC5-12)
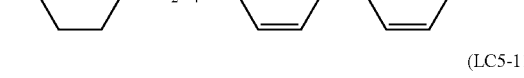

(LC5-13)
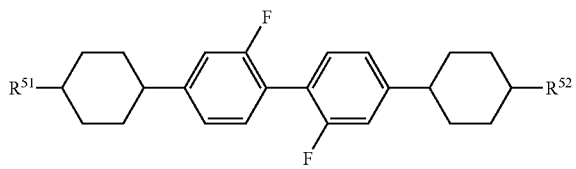

(LC5-14)
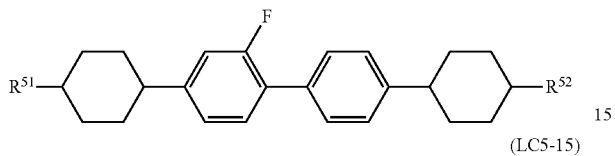

(LC5-15)
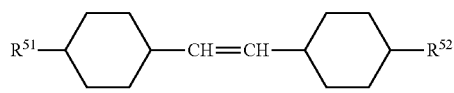

(LC5-16)

(LC5-17)
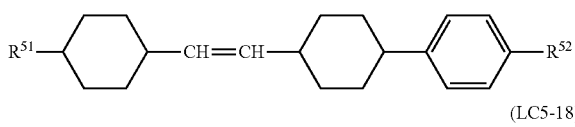

(LC5-18)
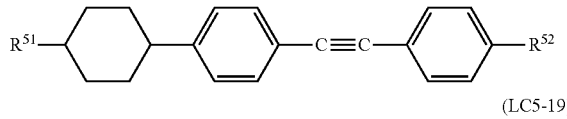

(LC5-19)
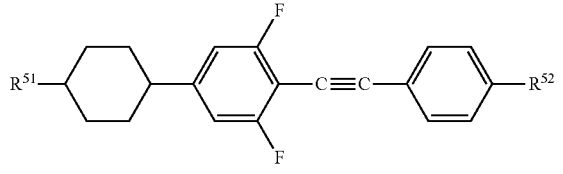

(LC5-20)
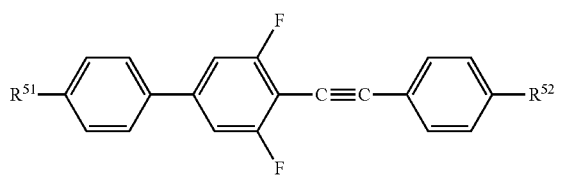

(LC5-21)
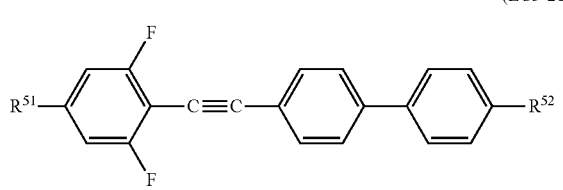

(LC5-22)
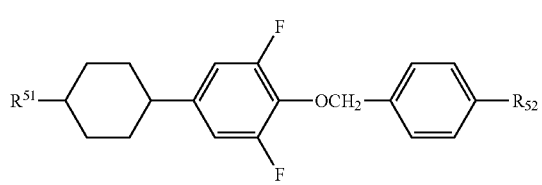

(LC5-23)
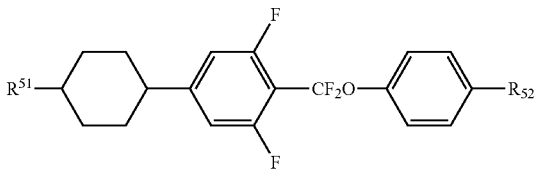

(LC5-24)
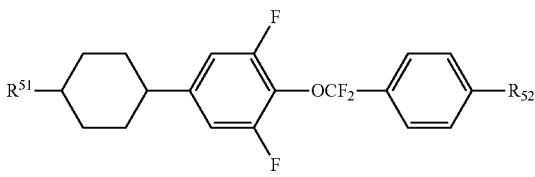

(LC5-25)
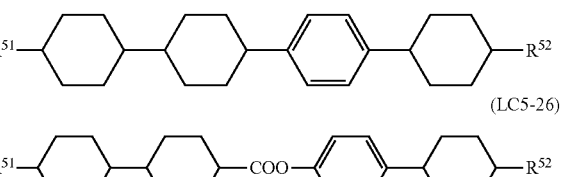

(LC5-26)
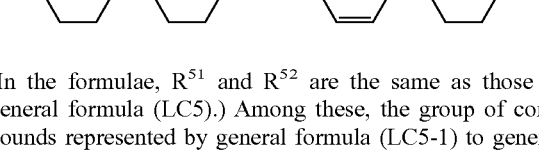

(In the formulae, $R^{51}$ and $R^{52}$ are the same as those in general formula (LC5).) Among these, the group of compounds represented by general formula (LC5-1) to general formula (LC5-8), general formula (LC5-14), general formula (LC5-16), and general formula (LC5-18) to general formula (LC5-26) is particularly preferably used in combination with the essential component of the present invention represented by general formula (LC0). At least one of $R^{51}$ and $R^{52}$ in general formula (LC5-1) and general formula (LC5-4) preferably represents an alkenyl group and more preferably an alkenyl group selected from those represented by formulae (R1) to (R5) below.

[Chem. 17]

(R1)

(R2)
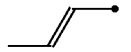

(R3)

(R4)
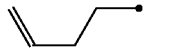

(R5)

One or more compounds represented by general formula (LC5) are preferably contained. The content thereof is preferably 20 to 70% by mass and more preferably 30 to 70% by mass.

The liquid crystal composition of the present invention contains a compound represented by general formula (LC0) and a compound selected from the group of compounds represented by general formula (LC1) to general formula (LC5). Of these compounds, at least one compound is a compound having a tetrahydropyran-2,5-diyl group and the content thereof is preferably in the range of 5 to 50% by mass and more preferably in the range of 10 to 40% by mass. The compound having a tetrahydropyran-2,5-diyl group which is an essential component of the liquid crystal composition of the present invention is preferably a compound represented by general formula (LC0), at least one of $A^{01}$ and $A^{02}$ in general formula (LC0) preferably represents a tetrahydropyran-2,5-diyl group, and the content thereof is preferably 5 to 50% by mass.

The liquid crystal composition of the present invention preferably has a viscosity η of 20 mPa·s or less at 20° C.

The liquid crystal composition of the present invention may contain one or more optically active compounds. The optically active compounds may be any capable of twisting and aligning liquid crystal molecules. Since twisting normally changes depending on temperature, plural optically active compounds may be used to obtain a desired temperature dependence. In order not to adversely affect the nematic liquid crystal phase temperature range, viscosity, and the like, it is preferable to select and use optically active compounds that have a powerful twisting effect. Examples of such optically active compounds to be contained include liquid crystals such as cholesteric nonanoate and compounds represented by general formula (Ch-1) to general formula (Ch-6) below:

(In the formulae, $R_{c1}$, $R_{c2}$, and $R^*$ each independently represent an alkyl group having 1 to 15 carbon atoms where one or more —$CH_2$— in the alkyl group may each be substituted with —O—, —CH=CH—, —CO—, —OCO—, —COO—, —C≡C—, —$CF_2$O—, or —$OCF_2$— so long as oxygen atoms are not directly adjacent to each other and one or more hydrogen atoms in the alkyl group may each be substituted with a halogen; $R^*$ includes at least one optically active branched chain group or halogen substituent; $Z_{c1}$ and $Z_{c2}$ each independently represent a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—; $D_1$ and $D_2$ each represent a cyclohexane ring or a benzene ring where one or more —$CH_2$— in the cyclohexane ring may each be substituted with —O— so long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N= so long as nitrogen atoms are not directly adjacent to each other, and one or more hydrogen atoms in the ring may each be substituted with F, Cl, or $CH_3$; $t_1$ and $t_2$ each represent 0, 1, 2, or 3; and MG*, $Q_{c1}$, and $Q_{c2}$ each represent the structure below:

[Chem. 18]

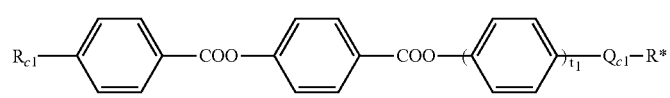

(Ch-1)

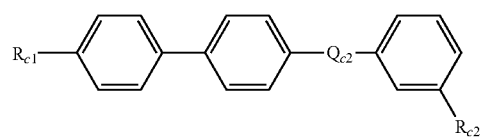

(Ch-2)

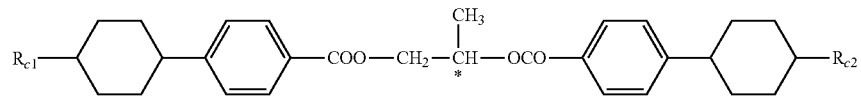

(Ch-3)

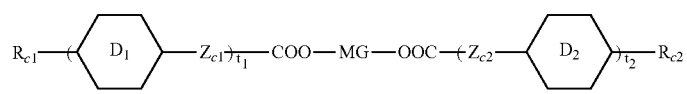

(Ch-4)

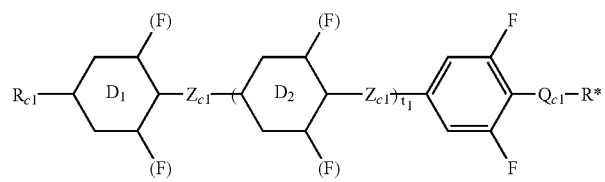

(Ch-5)

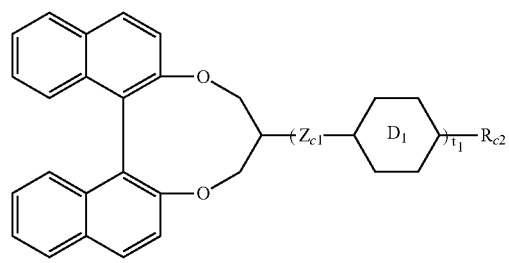

(Ch-6)

[Chem. 19]

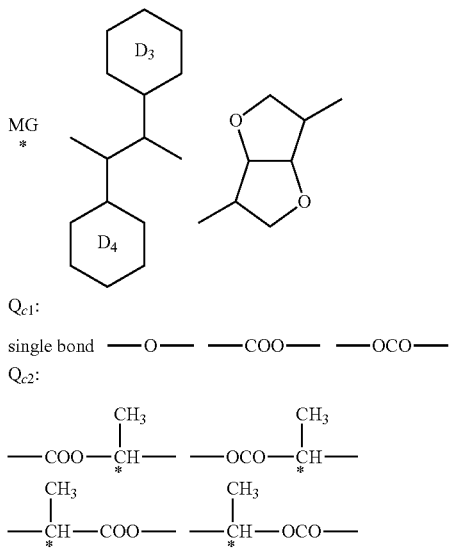

$Q_{c1}$:

single bond —O— —COO— —OCO—

$Q_{c2}$:

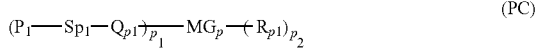

(In the formula, $D_3$ and $D_4$ each represent a cyclohexane ring or a benzene ring, one or more —$CH_2$— in the cyclohexane ring may each be substituted with —O— so long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N= so long as nitrogen atoms are not directly adjacent to each other, and one or more hydrogen atoms in the ring may each be substituted with F, Cl, or $CH_3$.)

The liquid crystal composition of the present invention may contain one or more polymerizable compounds. The polymerizable compounds are preferably discotic liquid crystal compounds which have a benzene derivative, a triphenylene derivative, a truxene derivative, a phthalocyanine derivative, or a cyclohexane derivative as a core at the molecular center and linear alkyl groups, linear alkoxy groups, or substituted benzoyloxy groups as side chains radially substituting the core.

To be specific, the polymerizable compounds are preferably compounds represented by general formula (PC):

[Chem. 20]

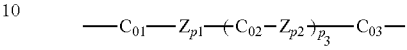
(PC)

(In the formula, $P_1$ represents a polymerizable functional group, $Sp_1$ represents a spacer group having 0 to 20 carbon atoms, $Q_{p1}$ represents a single bond, —O—, —NH—, —NHCOO—, —OCONH—, —CH=CH—, —CO—, —COO—, —OCO—, —OCOO—, —OOCO—, —CH=CH—, —CH=CH—COO—, —OCO—CH=CH—, or —C≡C—, $p_1$ and $p_2$ each independently represent 1, 2, or 3, $MG_p$ represents a mesogenic group or a mesogenic supporting group, and $R_{p1}$ represents a halogen atom, a cyano group, or an alkyl group having 1 to 25 carbon atoms where one or more $CH_2$ group in the alkyl group may each be substituted with —O—, —S—, —NH—, —N($CH_3$)—, —CO—, —COO—, —OCO—, —OCOO—, —SCO—, —COS—, or —C≡C— so long as oxygen atoms are not directly adjacent to each other, or $R_{p1}$ may represent $P_2$-$Sp_2$-$Q_{p2}$- where $P_2$, $Sp_2$, and $Q_{p2}$ are respectively the same as $P_1$, $Sp_1$, and $Q_{p1}$.)

More preferably, the polymerizable compounds are those represented by general formula (PC) with $MG_p$ representing the following structure:

[Chem. 21]

$$—C_{01}—Z_{p1}—(C_{02}—Z_{p2})_{p_3}—C_{03}—$$

(In the formula, $C_{01}$ to $C_{03}$ each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyradine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group; the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene-2,7-diyl group, and the fluorene-2,7-diyl group may each have, as a substituent, one or more selected from F, Cl, $CF_3$, $OCF_3$, a cyano group, an alkyl group having 1 to 8 carbon atoms, an alkoxy group, an alkanoyl group, an alkanoyloxy group, an alkenyl group having 2 to 8 carbon atoms, an alkenyloxy group, an alkenoyl group, and an alkenoyloxy group; $Z_{p1}$ and $Z_{p2}$ each independently represent —COO—, —OCO—, —$CH_2CH_2$—, —$OCH_2$—, —$CH_2O$—, —CH=CH—, —C≡C—, —CH=CHCOO—, —OCOCH=CH—, —$CH_2CH_2$COO—, —$CH_2CH_2$OCO—, —COO$CH_2CH_2$—, —OCO$CH_2CH_2$—, —CONH—, —NHCO—, or a single bond; and $p_3$ represents 0, 1, or 2.)

In the case where $Sp_1$ and $Sp_2$ each independently represent an alkylene group, the alkylene group may be substituted with one or more halogen atoms or CN and one or more $CH_2$ groups present in this group may each be substituted with —O—, —S—, —NH—, —N($CH_2$)—, —CO—, —COO—, —OCO—, —OCOO—, —SCO—, —COS—, or —C≡C— so long as oxygen atoms are not directly adjacent to each other. $P_1$ and $P_2$ preferably each independently represent a group selected from those represented by general formulae below:

[Chem. 22]

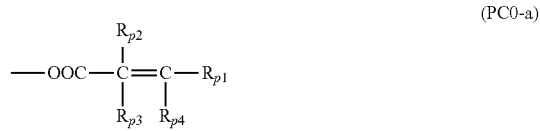
(PC0-a)

(PC0-b)

-continued (PC0-c)
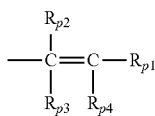

(PC0-d)
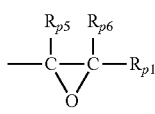

(In the formulae, $R_{p2}$ to $R_{p6}$ each independently represent a hydrogen atom, a halogen atom, or an alkyl group having 1 to 5 carbon atoms.)

To be more specific, the polymerizable compounds represented by general formula (PC) are preferably compounds represented by general formula (PC0-1) to general formula (PC0-6) below:

[Chem. 23]

$(P_1\text{-}Sp_1\text{-}Q_{p1})_{p1}MG_p(\text{-}Q_{p2}\text{-}Sp_2\text{-}P_2)_{p4}$ (PC0-1)

$(P_1\text{-}Q_{p1})_{p1}MG_p(\text{-}Q_{p2}\text{-}P_2)_{p4}$ (PC0-2)

$P_1\text{-}Sp_1\text{-}Q_{p1}\text{-}MG_p\text{-}Q_{p2}\text{-}Sp_2\text{-}P_2$ (PC0-3)

$P_1\text{-}Q_{p1}\text{-}MG_p\text{-}Q_{p2}\text{-}P_2$ (PC0-4)

$P_1\text{-}Sp_1\text{-}Q_{p1}\text{-}MG_p\text{-}R_{p1}$ (PC0-5)

$P_1\text{-}Q_{p1}\text{-}MG_p\text{-}R_{p1}$ (PC0-6)

(In the formulae, $p_4$ each independently represent 1, 2, or 3.)

The polymerizable compounds represented by general formula (PC0) are more preferably compounds represented by more specific formulae, namely, general formula (PC1-1) to general formula (PC1-9) below:

[Chem. 24]

(PC1-1)
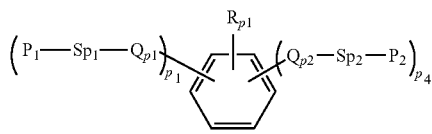

(PC1-2)
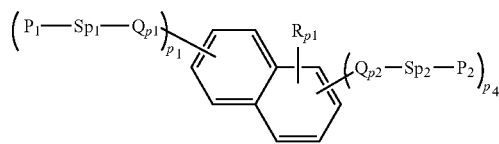

(PC1-3)
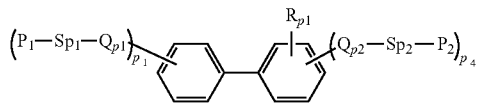

(PC1-4)
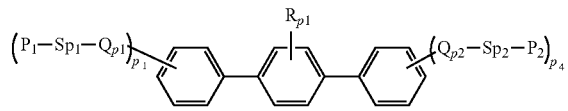

(PC1-5)
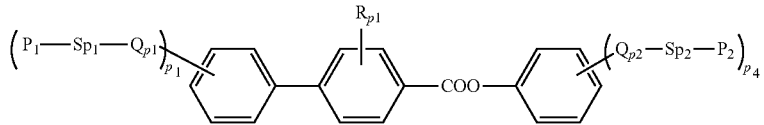

(PC1-6)
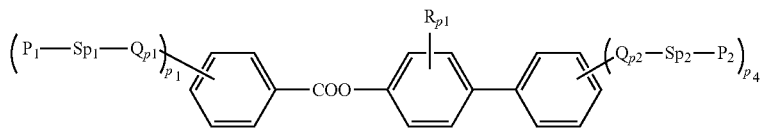

(PC1-7)
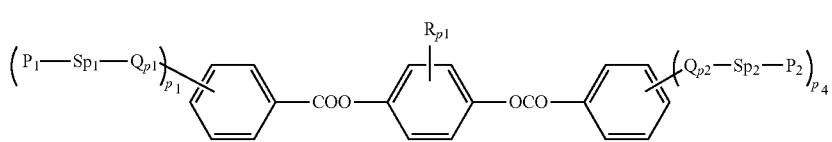

(PC1-8)
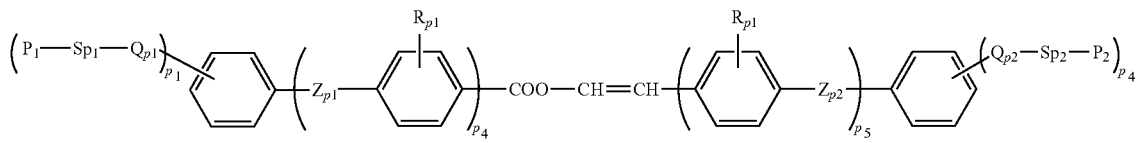

(PC1-9)

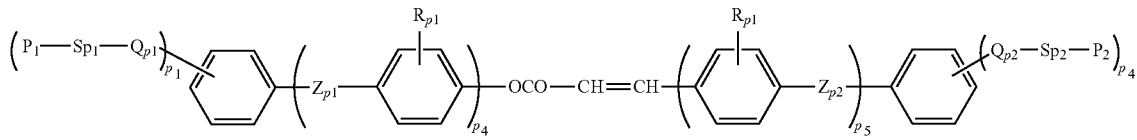

(In the formulae, $p_5$ represents 0, 1, 2, 3, or 4.)

More preferable are polymerizable compounds represented by general formula (PC) to general formula (PC1-9) with $Sp_1$, $Sp_2$, $Q_{p1}$, and $Q_{p2}$ all representing single bonds, polymerizable compounds with $P_1$ and $P_2$ representing a group represented by formula (PC0-a), an acrylate, and/or a methacrylate, polymerizable compounds represented by general formula (PC0-1) and general formula (PC0-2) with $p_1$ and $p_4$ satisfying $p_1+p_4=1$ to 6, and polymerizable compounds represented by general formula (PC1-1) and general formula (PC1-9) with $R_{p1}$ representing F, $CF_3$, $OCF_3$, $CH_3$, or $OCH_3$, where the number of substituents $R_{p1}$ is 1, 2, 3, or 4.

Also preferable is a discotic liquid crystal compound represented by general formula (PC) with $MG_p$ representing a group represented by general formula (PC1)-9.

[Chem. 25]

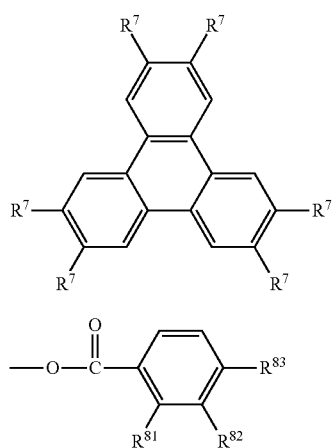

(PC1)-9

(PC1-e)

(In the formulae, $R_7$ each independently represent $P_1$-$Sp_1$-$Q_{p1}$ or a substituent represented by general formula (PC1-e), $R_{81}$ and $R_{82}$ each independently represent a hydrogen atom, a halogen atom, or a methyl group, $R_{83}$ represents an alkoxy group having 1 to 20 carbon atoms, and at least one of hydrogen atoms in the alkoxy group is substituted with a substituent represented by any one of general formulae (PC0-a) to (PC0-d) above.) The amount of the polymerizable compounds used is preferably 0.05 to 2.0% by mass.

The liquid crystal composition of the present invention containing a polymerizable compound is used to manufacture a liquid crystal composition through polymerizing the polymerizable compound. During this process, the amount of the unpolymerized components is preferably decreased to a desired level or less. A liquid crystal composition of the present invention suited for this use preferably contains a compound having a biphenyl group or a terphenyl group as a partial structure in general formula (LC0). More specifically, it is preferable to use 0.1 to 40% by mass of at least one selected from the group of compounds represented by general formula (LC0-4) to general formula (LC0-6), general formula (LC0-10) to general formula (LC0-16), and general formula (LC0-27) to general formula (LC0-107). The compound is preferably used in combination with a polymerizable compound selected from those represented by general formula (PL1-1) to general formula (PL1-3), general formula (PC1-8), and general formula (PC1-9).

The liquid crystal composition may further contain one or more antioxidants and one or more UV absorbers. The antioxidant is preferably selected from those represented by general formula (E-1) and/or general formula (E-2) below:

[Chem. 26]

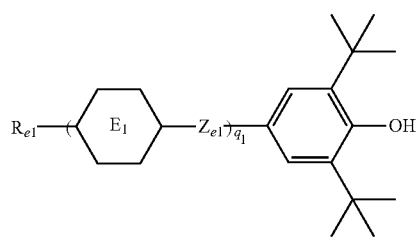

(In the formulae, $R_{e1}$ represents an alkyl group having 1 to 15 carbon atoms, one or more —$CH_2$— in the alkyl group may each be substituted with —O—, —CH=CH—, —CO—, —OCO—, —COO—, —C≡C—, —$CF_2$O—, or —$OCF_2$— so long as oxygen atoms are not directly adjacent to each other, and one or more hydrogen atoms in the alkyl group may each be substituted with a halogen;
$Z_{e1}$ and $Z_{e2}$ each independently represent a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—; and
$E_1$ represents a cyclohexane ring or a benzene ring, one or more —$CH_2$— in the cyclohexane ring may each be substituted with —O— so long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N= so long as nitrogen atoms are not directly adjacent to each other, one or more hydrogen atoms in the ring may each be substituted with F, Cl, or $CH_3$, and $q_1$ represents 0, 1, 2, or 3.)

The liquid crystal composition according to the present invention can be used in liquid crystal display devices, in particular, active matrix driving liquid crystal display devices of, for example, TN mode, OCB mode, ECB mode, IPS (including FFS electrodes) mode, or VA-IPS mode (including FFS electrodes). Here, the VA-IPS mode refers to a driving mode in which a liquid crystal material having a positive dielectric anisotropy ($\Delta\in >0$) is vertically aligned with respect to the substrate surface in the absence of applied voltage and liquid crystal molecules are driven by using pixel electrodes and a common electrode arranged on the same substrate surface. Since liquid crystal molecules align in a direction of the curved electric field generated by the pixel electrodes and the common electrode, it is easy to divide pixels into sub-areas to form a multi-domain structure and enhance response. Such a system is referred to as EOC, VA-IPS, etc., according to Non-Patent Literatures Proc. 13th IDW, 97 (1997), Proc. 13th IDW, 175 (1997), SID Sym. Digest, 319 (1998), SID Sym. Digest, 838 (1998), SID Sym. Digest, 1085 (1998), SID Sym. Digest, 334 (2000), and Eurodisplay Proc., 142 (2009). In the present invention, the name "VA-IPS" is used.

In general, the threshold voltage (Vc) of the Freedericksz transition for TN and ECB mode is determined by the following expression:

$$Vc = \frac{\pi d_{cell}}{d_{cell} + \langle r_1 \rangle} \sqrt{\frac{K11}{\Delta \varepsilon}} \quad \text{[Math. 1]}$$

Vc for STN mode is determined by the following expression:

$$Vc = \frac{\pi d_{gap}}{d_{cell} + \langle r_2 \rangle} \sqrt{\frac{K22}{\Delta \varepsilon}} \quad \text{[Math. 2]}$$

Vc for VA mode is determined by the following expression:

$$Vc = \frac{\pi d_{cell}}{d_{cell} - \langle r_3 \rangle} \sqrt{\frac{K33}{|\Delta \varepsilon|}} \quad \text{[Math. 3]}$$

(In the expressions, Vc denotes the Freedericksz transition (V), $\pi$ denotes the circular constant, $d_{cell}$ denotes the gap (μm) between a first substrate and a second substrate, $d_{gap}$ denotes the gap (μm) between the pixel electrodes and the common electrode, $d_{ITO}$ denotes the width (μm) of the pixel electrodes and/or the common electrode, $\langle r1 \rangle$, $\langle r2 \rangle$, and $\langle r3 \rangle$ denote the extrapolation length (μm), K11 denotes the splay elastic constant (N), K22 denotes the twist elastic constant (N), K33 denotes the bend elastic constant (N), and $\Delta\in$ denotes the dielectric anisotropy.)

It has been found that the following mathematical expression 4 is applicable to the present invention etc., for VA-IPS mode:

$$Vc \propto \frac{d_{gap} - \langle r' \rangle}{d_{ITO} + \langle r \rangle} \frac{\pi d_{cell}}{d_{cell} - \langle r_3 \rangle} \sqrt{\frac{K33}{|\Delta \varepsilon|}} \quad \text{[Math. 4]}$$

(In the expression, Vc denotes the Freedericksz transition (V), n denotes the circular constant, $d_{cell}$ denotes the gap (μm) between a first substrate and a second substrate, $d_{gap}$ denotes the gap (μm) between the pixel electrodes and the common electrode, $d_{ITO}$ denotes the width (μm) of the pixel electrodes and/or the common electrode, $\langle r \rangle$, $\langle r' \rangle$, and $\langle r3 \rangle$ denote the extrapolation length (μm), K33 denotes the bend elastic constant (N), and $\Delta\in$ denotes the dielectric anisotropy.) Mathematical expression 4 shows that the cell structure may be designed to decrease $d_{gap}$ as much as possible and increase $d_{ITO}$ as much as possible to achieve low drive voltage and that a liquid crystal composition having $\Delta\in$ with a large absolute value and a low K33 may be selected as the liquid crystal composition to achieve low drive voltage.

The liquid crystal composition of the present invention can be adjusted to exhibit desirable $\Delta\in$, K11, K33, etc.

The product ($\Delta$n·d) of the refractive index anisotropy ($\Delta$n) of the liquid crystal composition and the gap (d) between the first substrate and the second substrate of a display device is strongly related to viewing angle characteristics and response speed. Accordingly, the gap (d) tends to be as small as 3 to 4 μm. The product ($\Delta$n·d) is particularly preferably 0.31 to 0.33 for the TN, ECB, and IPS (liquid crystal aligns substantially horizontal to the substrate surface in the absence of applied voltage) modes. For the VA-IPS mode, the product is preferably 0.20 to 0.59 and more preferably 0.30 to 0.40 if the alignment is vertical with respect to the two substrates. Since the suitable value of the product ($\Delta$n·d) differs depending on the mode of the display device, a liquid crystal composition capable of exhibiting a refractive index anisotropy ($\Delta$n) in various different ranges, such as 0.070 to 0.110, 0.100 to 0.140, or 0.130 to 0.180 is required. In order to obtain a small or relatively small refractive index anisotropy ($\Delta$n) from the liquid crystal composition of the present invention, it is preferable to use 0.1 to 80% by mass of one or more compounds selected from the group consisting of compounds represented by general formula (LC0-1) to general formula (LC0-3), general formula (LC0-7) to general formula (LC0-9), and general formula (LC0-20) to general formula (LC0-30). In order to obtain a large or relatively large refractive index anisotropy ($\Delta$n), it is preferable to use 0.1 to 60% by mass of one or more compounds selected from the group consisting of compounds represented by general formula (LC0-4) to general formula (LC0-6), general formula (LC0-10) to general formula (LC0-16), and general formula (LC0-27) to general formula (LC0-107). For the TN and ECB modes that require the liquid crystal to align substantially horizontal to the substrate surface in the absence of applied voltage, the tilt angle is preferably 0.5 to 7°. For the VA-IP mode that requires the liquid crystal to align substantially perpendicular to the substrate surface in the absence of applied voltage, the tilt angle is preferably 85 to 90°. In order to have the liquid crystal composition aligned in such a manner, alignment films composed of polyimide (PI), polyamide, chalcone, cinnamate, cinnamoyl, or the like may be provided. The alignment films are preferably formed by using an optical alignment technology. A liquid crystal composition of the present invention containing a compound represented by general formula (LC0) having a partial structure in which $X^{01}$ represents F can be easily aligned along the easy axis of the alignment films and the desired tilt angle can be easily formed.

A liquid crystal composition of the present invention containing a compound represented by general formula (PC) as the polymerizable compound can be used to form a polymer-stabilized TN-mode, OCB-mode, ECB-mode, IPS-mode, or VA-IPS mode liquid crystal display device prepared by polymerizing the polymerizable compounds in the liquid crystal composition in the presence or absence of applied voltage.

EXAMPLES

The present invention will now be described in further detail by using Examples which do not limit the scope of the present invention. Note that the "%" for compositions of Examples and Comparative Examples below means "% by mass".

The physical properties of the liquid crystal composition are presented as follows:

$T_{N-I}$: nematic phase-isotropic liquid phase transition temperature (° C.)
T-n: lower limit temperature (° C.) of nematic phase
$\epsilon\perp$: dielectric constant in a direction perpendicular to the molecular long axis at 25° C.
$\Delta\epsilon$: dielectric anisotropy at 25° C.
no: refractive index for ordinary rays at 25° C.
$\Delta n$: refractive index anisotropy at 25° C.
Vth: voltage (V) applied to a 6 μm-thick cell at which the transmittance changes by 10% when square waves are applied at a frequency of 1 KHz at 25° C.
Viscosity: bulk viscosity (mPa·s) at 20° C.
$\gamma_1$: rotational viscosity (mPa·s)

Compounds are abbreviated as follows:

TABLE 1

| n (numeral) at terminus | $C_nH_{2n+1}$— |
|---|---|
| -2- | —CH$_2$CH$_2$— |
| -1O- | —CH$_2$O— |
| -O1- | —OCH$_2$— |
| —V— | —CO— |
| —VO— | —COO— |
| —CFFO— | —CF$_2$O— |
| —F | —F |
| —Cl | —Cl |
| —CN | —C≡N |
| —OCFFF | —OCF$_3$ |
| —CFFF | 0 |
| —OCFF | —OCHF$_2$ |
| —On | —OC$_n$H$_{2n+1}$ |
| -T- | —C≡C— |
| ndm- | $C_nH_{2n+1}$—HC=CH—(CH$_2$)$_{m-1}$— |
| -ndm | —(CH$_2$)$_{n-1}$—HC=CH—C$_m$H$_{2m+1}$ |
| ndmO— | $C_nH_{2n+1}$—HC=CH—(CH$_2$)$_{m-1}$—O— |
| —Ondm | —O—(CH$_2$)$_{n-1}$—HC=CH—C$_m$H$_{2m+1}$ |

[Chem. 27]

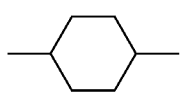 Cy

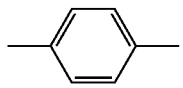 Ph

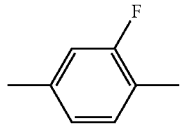 Ph1

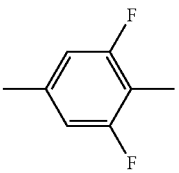 Ph3

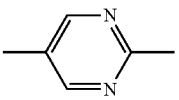 Ma

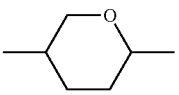 Pr

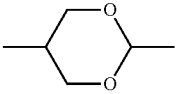 Oc

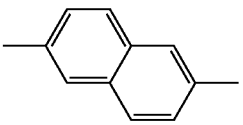 Np

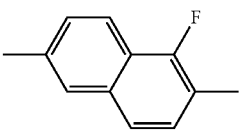 Np1

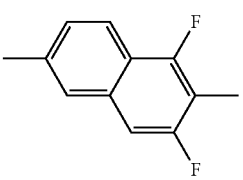 Np3

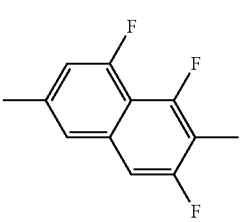 Np4

Example 1

A liquid crystal composition prepared and physical properties thereof are shown below:

TABLE 2

| 1d1-Cy-Cy-3 | 15.0% |
|---|---|
| od1-Cy-Cy-1d1 | 15.0 |
| 2-Cy-Cy-Ph-1 | 5.0 |
| 3-Cy-Cy-Ph-1 | 7.0 |
| 1-Ph—Ph1—Ph-3d0 | 8.0 |
| 3-Cy-Cy-Ph3—OCFFF | 10.0 |
| 3-Cy-Cy-CFFO—Ph3—F | 5.0 |
| 3-Cy-Ph1—Ph3—CFFO—Ph3—F | 10.0 |
| 3-Pr—Ph3—O1—Ph—OCFFF | 15.0 |
| 3-Pr—Ph3—O1—Ph3—F | 10.0 |
| Tni | 72.2 |

TABLE 2-continued

| | |
|---|---|
| T-n | −33.0 |
| Vth | 1.42 |
| γ1 | 67.0 |
| ε⊥ | 3.57 |
| Δε | 8.37 |
| no | 1.486 |
| Δn | 0.094 |
| Viscosity | 13.1 |

Comparative Example 1

A liquid crystal composition prepared and physical properties thereof are shown below:

TABLE 3

| | |
|---|---|
| 1d1-Cy-Cy-3 | 15.0% |
| od1-Cy-Cy-1d1 | 15.0 |
| 2-Cy-Cy-Ph-1 | 5.0 |
| 3-Cy-Cy-Ph-1 | 7.0 |
| 1-Ph—Ph1—Ph-3d0 | 8.0 |
| 3-Cy-Cy-Ph3—OCFFF | 10.0 |
| 3-Cy-Cy-CFFO—Ph3—F | 5.0 |
| 3-Cy-Ph1—Ph3—CFFO—Ph3—F | 10.0 |
| 3-Pr—Ph3-1O—Ph—OCFFF | 15.0 |
| 3-Pr—Ph—O1—Ph3—F | 10.0 |
| Tni | 67.0 |
| T-n | −33.0 |
| Vth | 1.50 |
| γ1 | 94.0 |
| ε⊥ | 3.55 |
| Δε | 7.87 |
| no | 1.485 |
| Δn | 0.093 |
| Viscosity | 20.5 |

This liquid crystal composition does not contain a compound represented by general formula (LC0) having a -Ph3-OCH$_2$— partial structure disclosed in this application. Although Example 1 has a larger dielectric anisotropy (Δε) and a high nematic phase-isotropic liquid phase transition temperature (T$_{ni}$), Example 1 has viscosity substantially lower than that of Comparative Example 1, and small γ$_1$. This shows that the combination of the present invention has outstanding benefits.

Example 2

A liquid crystal composition prepared and physical properties thereof are shown below:

TABLE 4

| | |
|---|---|
| 1d1-Cy-Cy-3 | 10.0% |
| od1-Cy-Cy-1d1 | 10.0 |
| 3-Cy-Cy-2 | 5.0 |
| 3-Pr—Ph3—O1—Ph—OCFFF | 5.0 |
| 3-Pr—Ph3—O1—Ph3—F | 5.0 |
| 3-Pr—Ph1—Ph3—O1—Ph3—F | 10.0 |
| 3-Pr-Cy-Ph3—O1—Ph—OCFFF | 5.0 |
| 3-Cy-Pr—Ph3—O1—Ph3—F | 5.0 |
| 3-Cy-Cy-Ph3—O1—Ph3—F | 5.0 |
| 3-Cy-Ph—Ph3—O1—Ph3—F | 5.0 |
| 3-Ph—Ph1—Ph3—O1—Ph3—F | 10.0 |
| 3-Ph—Ph1—Np3—F | 5.0 |
| Tni | 79.2 |
| T-n | −36.0 |
| Vth | 1.38 |
| γ1 | 76.0 |

TABLE 4-continued

| | |
|---|---|
| ε⊥ | 3.86 |
| Δε | 9.87 |
| no | 1.485 |
| Δn | 0.090 |
| Viscosity | 14.1 |

Example 3

A liquid crystal composition prepared and physical properties thereof are shown below:

TABLE 5

| | |
|---|---|
| 0d1-Cy-Cy-3 | 10.0% |
| 1d1-Cy-Cy-2 | 10.0 |
| 1d1-Cy-Cy-3 | 15.0 |
| 2-Cy-Cy-Ph-1 | 2.0 |
| 3-Cy-Cy-Ph-1 | 3.0 |
| 3-Pr-Cy-Ph3—O1—Ph—OCFFF | 5.0 |
| 3-Cy-Pr—Ph3—O1—Ph3—F | 5.0 |
| 3-Cy-Ph3—O1—Ph—OCFFF | 10.0 |
| 3-Ph—Ph3—O1—Ph—OCFFF | 10.0 |
| 3-Cy-Cy-Ph3—O1—Ph3—F | 10.0 |
| 3-Cy-Ph—Ph3—O1—Ph3—F | 10.0 |
| 3-Ph—Ph1—Ph3—O1—Ph3—F | 10.0 |
| Tni | 84.6 |
| T-n | −31.0 |
| Vth | 1.43 |
| γ1 | 72.0 |
| ε⊥ | 3.71 |
| Δε | 8.41 |
| no | 1.488 |
| Δn | 0.095 |
| Viscosity | 12.8 |

Example 4

A liquid crystal composition prepared and physical properties thereof are shown below:

TABLE 6

| | |
|---|---|
| 1d1-Cy-Cy-2 | 10.0% |
| 1d1-Cy-Cy-3 | 15.0 |
| od1-Cy-Cy-1d1 | 15.0 |
| 3-Cy-Cy-2 | 2.0 |
| 2-Cy-Cy-Ph-1 | 3.0 |
| 3-Cy-Cy-Ph-1 | 5.0 |
| 1-Ph—Ph1—Ph-3d0 | 5.0 |
| 3-Cy-Ph—Ph3—OCFFF | 5.0 |
| 3-Pr—Ph3—O1—Ph—OCFFF | 5.0 |
| 3-Pr—Ph1—Ph3—O1—Ph3—F | 10.0 |
| 3-Cy-Ph3—O1—Ph—OCFFF | 10.0 |
| 3-Ph—Ph3—O1—Ph—OCFFF | 5.0 |
| 3-Cy-Cy-Ph3—O1—Ph3—F | 10.0 |
| Tni | 76.0 |
| T-n | −39.0 |
| Vth | 1.69 |
| γ1 | 60.0 |
| ε⊥ | 3.39 |
| Δε | 6.40 |
| no | 1.486 |
| Δn | 0.090 |
| Viscosity | 10.7 |

Example 5

A liquid crystal composition prepared and physical properties thereof are shown below:

TABLE 7

| Compound | Example 5 |
| --- | --- |
| 0d1-Cy-Cy-3 | 10.0% |
| 1d1-Cy-Cy-2 | 15.0 |
| 1d1-Cy-Cy-3 | 15.0 |
| od1-Cy-Cy-1d1 | 5.0 |
| 3-Cy-Cy-Ph3—OCFFF | 5.0 |
| 3-Cy-Ph—Ph3—OCFFF | 5.0 |
| 3-Cy-Cy-CFFO—Ph3—F | 5.0 |
| 3-Cy-Ph1—Ph3—CFFO—Ph3—F | 5.0 |
| 3-Pr—Ph1—Ph3—O1—Ph3—F | 5.0 |
| 3-Pr-Cy-Ph3—O1—Ph—OCFFF | 5.0 |
| 3-Cy-Pr—Ph3—O1—Ph3—F | 5.0 |
| 3-Cy-Ph3—O1—Ph—OCFFF | 5.0 |
| 3-Ph—Ph3—O1—Ph—OCFFF | 5.0 |
| 3-Cy-Cy-Ph3—O1—Ph3—F | 5.0 |
| 3-Cy-Ph—Ph3—O1—Ph3—F | 5.0 |
| Tni | 78.9 |
| T-n | −36.0 |
| Vth | 1.44 |
| γ1 | 74.0 |
| ε⊥ | 3.56 |
| Δε | 8.22 |
| no | 1.484 |
| Δn | 0.081 |
| Viscosity | 13.1 |

Example 6

A liquid crystal composition prepared and physical properties thereof are shown below:

TABLE 8

| 0d1-Cy-Cy-3 | 10.0% |
| --- | --- |
| 1d1-Cy-Cy-2 | 10.0 |
| 1d1-Cy-Cy-3 | 10.0 |
| od1-Cy-Cy-1d1 | 10.0 |
| 3-Cy-Cy-Ph-1 | 7.0 |
| 1-Ph—Ph1—Ph-3d0 | 8.0 |
| 3-Pr—Ph1—Ph3—O1—Ph3—F | 10.0 |
| 3-Pr-Cy-Ph3—O1—Ph—OCFFF | 10.0 |
| 3-Ph—Ph3—O1—Ph—OCFFF | 10.0 |
| 3-Cy-Ph—Ph3—O1—Ph3—F | 5.0 |
| 3-Ph—Ph1—Ph3—O1—Ph3—F | 10.0 |
| Tni | 91.8 |
| T-n | −36.0 |
| Vth | 1.53 |
| γ1 | 79.0 |
| ε⊥ | 3.54 |
| Δε | 7.52 |
| no | 1.490 |
| Δn | 0.110 |
| Viscosity | 14.3 |

Example 7

A vertical alignment film was formed on a first substrate that had a pair of comb-shaped transparent electrodes. Another vertical alignment film was formed on a second substrate that had no electrode structure. The first substrate and the second substrate were formed into an IPS empty cell having a gap spacing of 4.0 μm. The liquid crystal composition of Example 1 was poured into the empty cell to prepare a liquid crystal display device.

To 99% of the liquid crystal composition of Example 1, 1% of a polymerizable compound represented by formula (PC-1)-3-1 was added and homogeneously dissolved:

[Chem. 28]

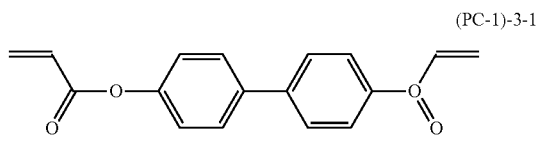

(PC-1)-3-1

As a result, a polymerizable liquid crystal composition CLC-A was obtained. The physical properties of CLC-A were substantially the same as physical properties of the liquid crystal composition of Example 1.

CLC-A was held in the IPS empty cell described above. The liquid crystal cell was then irradiated with ultraviolet light using a high-pressure mercury lamp through a filter that cuts off ultraviolet rays of 300 nm or less while applying 1.8 V square waves at a frequency of 1 KHz. The irradiation was conducted for 600 seconds while adjusting the irradiation intensity at the cell surface to be 20 mW/cm². As a result, a vertical-alignment liquid crystal display device in which a polymerizable compound in the polymerizable liquid crystal composition was polymerized was obtained. This display device had significantly high response speed compared to the liquid crystal display device formed by using only the liquid crystal composition of Example 1.

The invention claimed is:

1. A liquid crystal composition having a positive dielectric anisotropy and containing one or more compounds selected from compounds represented by general formula (LC0) and one or more compounds selected from a group of compounds represented by general formula (LC1) to general formula (LC5), wherein the liquid crystal composition contains one or more compounds in which at least one of $A^{01}$ and $A^{02}$ in general formula (LC0) represents a tetrahydropyran-2,5-diyl group:

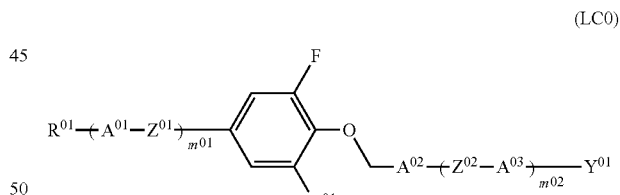

(LC0)

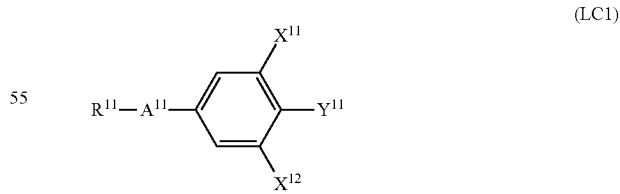

(LC1)

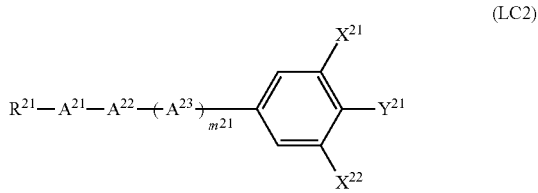

(LC2)

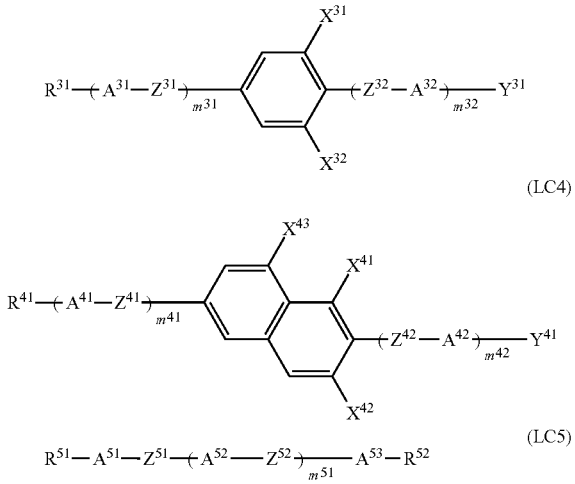

(LC3)

(LC4)

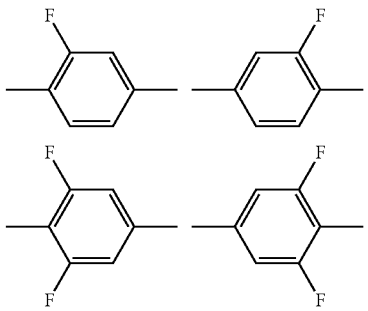

(LC5)

wherein in the formulae, $R^{01}$ to $R^{41}$ each independently represent an alkyl group having 1 to 15 carbon atoms where one or more —$CH_2$— in the alkyl group may each be substituted with —O—, —CH=CH—, —CO—, —OCO—, —COO—, —C≡C—, —$CF_2O$—, or —$OCF_2$— so long as oxygen atoms are not directly adjacent to each other and one or more hydrogen atoms in the alkyl group may each be substituted with a halogen; $R^{51}$ and $R^{52}$ each independently represent an alkyl group having 1 to 15 carbon atoms where one or more —$CH_2$— in the alkyl group may each be substituted with —O—, —CH=CH—, —CO—, —OCO—, —COO—, or —C≡C— so long as oxygen atoms are not directly adjacent to each other, and may each represent —$OCF_3$ or —$CF_3$ when $A^{51}$ or $A^{53}$ described below represents a cyclohexane ring; $A^{01}$ to $A^{42}$ each independently represent any one of structures below:

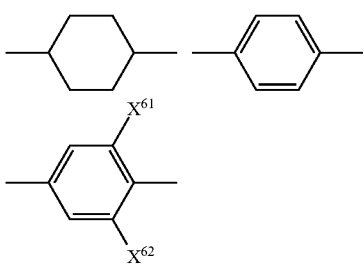

wherein in the structures, one or more —$CH_2$— in the cyclohexane ring may each be substituted with —O— so long as oxygen atoms are not directly adjacent to each other; in the structures, one or more —CH= in the benzene ring may each be substituted with —N= so long as nitrogen atoms are not directly adjacent to each other; and $X^{61}$ and $X^{62}$ each independently represent —H, —Cl, —F, —$CF_3$, or —$OCF_3$; $A^{51}$ to $A^{53}$ each independently represent any one of structures below:

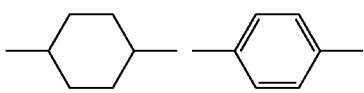

wherein in the formulae, one or more —$CH_2CH_2$— in the cyclohexane ring may each be substituted with —CH=CH—, —$CF_2O$—, or —$OCF_2$— and one or more —CH= in the benzene ring may each be substituted with —N= so long as nitrogen atoms are not directly adjacent to each other; $X^{01}$ represents a hydrogen atom or a fluorine atom; $X^{11}$ to $X^{43}$ each independently represent —H, —Cl, —F, —$CF_3$, or —$OCF_3$; $Y^{01}$ to $Y^{41}$ each represent —Cl, —F, —$OCHF_2$, —$CF_3$, or —$OCF_3$; $Z^{01}$ and $Z^{02}$ each independently represent a single bond, —CH=CH—, —C≡C—, —$CH_2CH_2$—, —$(CH_2)_4$—, —$OCF_2$—, or —$CF_2O$—; $Z^{31}$ to $Z^{42}$ each independently represent a single bond, —CH=CH—, —C≡C—, —$CH_2CH_2$—, —$(CH_2)_4$—, —$OCF_2$—, or —$CF_2O$— where at least one of $Z^{31}$ and $Z^{32}$ that are present represents a group other than a single bond; $Z^{51}$ and $Z^{52}$ each independently represent a single bond, —CH=CH—, —C≡—, —$CH_2CH_2$—, —$(CH_2)_4$—, —$OCH_2$—, —$CH_2O$—, —$OCF_2$— or —$CF_2O$—; $m^{01}$ to $m^{51}$ each independently represent an integer of 0 to 3; $m^{01}+m^{02}$, $m^{31}+m^{32}$, and $m^{41}+m^{42}$ are each independently 1, 2, 3, or 4; and when a plurality of $A^{01}$, $A^{03}$, $A^{23}$, $A^{31}$, $A^{32}$, $A^{41}$, $A^{42}$, $A^{52}$, $Z^{01}$, $Z^{02}$, $Z^{31}$, $Z^{32}$, $Z^{41}$, $Z^{42}$, and/or $Z^{52}$ are present, they may be the same or different.

2. The liquid crystal composition according to claim 1, wherein $X^{01}$ in general formula (LC0) represents F.

3. The liquid crystal composition according to claim 1, wherein the liquid crystal composition contains one or more compounds selected from the group consisting of compounds represented by general formula (LC2-1) to general formula (LC2-14) as the compound represented by general formula (LC2):

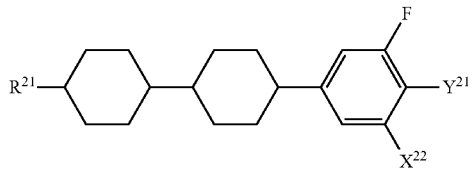

(LC2-1)

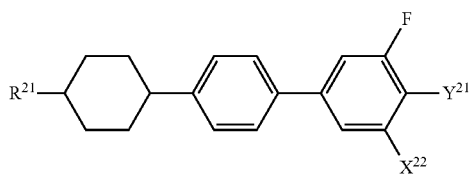

(LC2-2)

-continued (LC2-3)
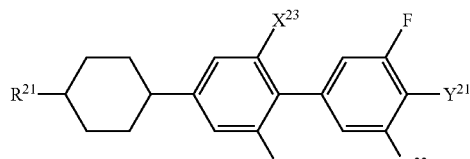

(LC2-4)
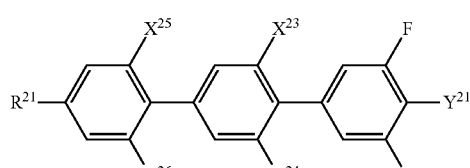

(LC2-5)
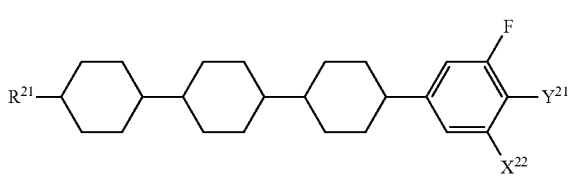

(LC2-6)
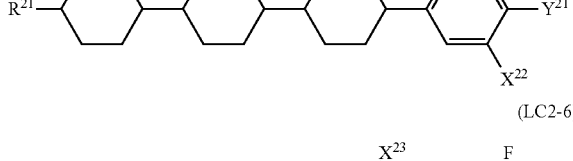

(LC2-7)
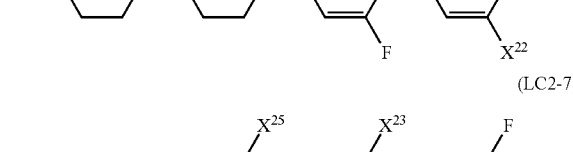

(LC2-8)
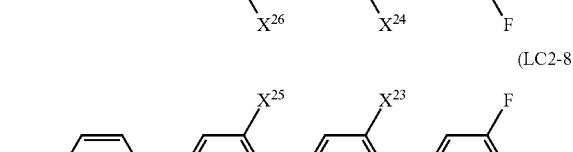

(LC2-9)
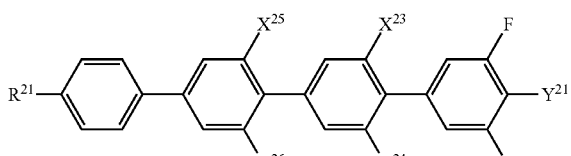

(LC2-10)
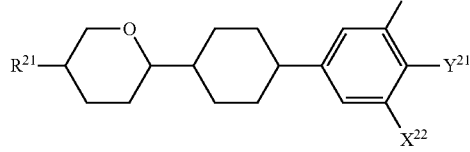

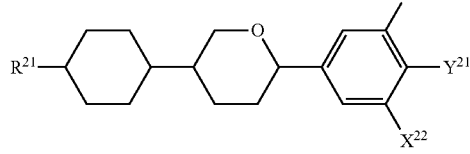

-continued (LC2-11)
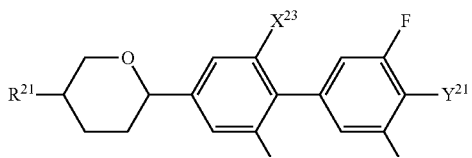

(LC2-12)
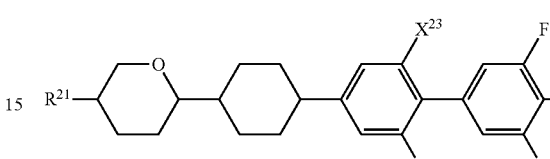

(LC2-13)
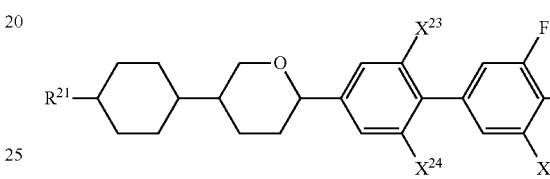

(LC2-14)
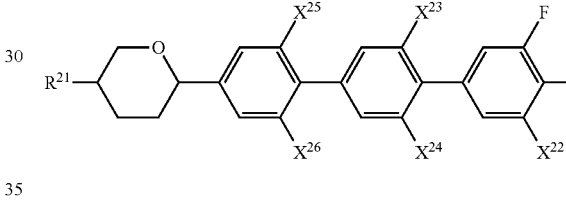

wherein in the formulae, $X^{23}$, $X^{24}$, $X^{25}$, and $X^{26}$ each independently represent a hydrogen atom Cl, F, $CF_3$, or $OCF_3$, and $X^{22}$, $R^{21}$, and $Y^{21}$ are the same as those in claim 1.

4. The liquid crystal composition according to claim 1, wherein the liquid crystal composition contains one or more compounds selected from the group consisting of compounds represented by general formula (LC3-1) to general formula (LC3-32) as the compound represented by general formula (LC3):

(LC3-1)
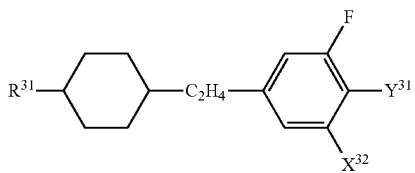

(LC3-2)
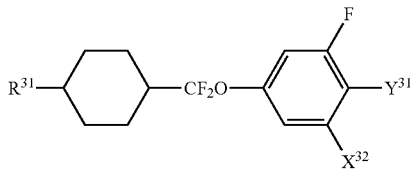

(LC3-3)
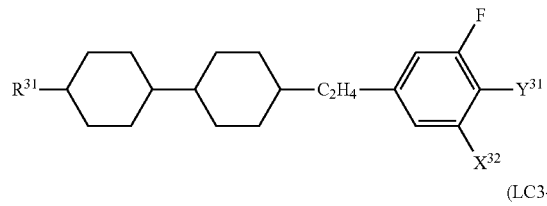
(LC3-4)
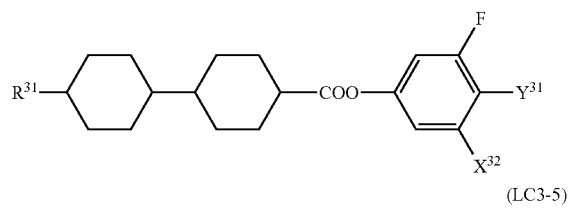
(LC3-5)
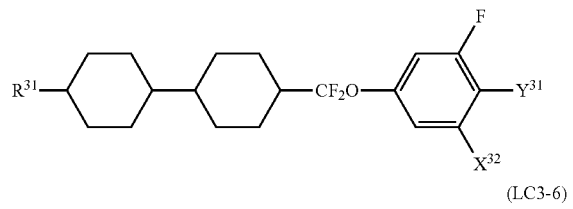
(LC3-6)
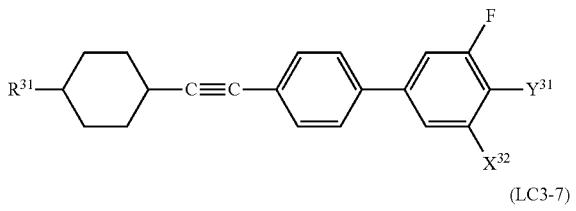
(LC3-7)
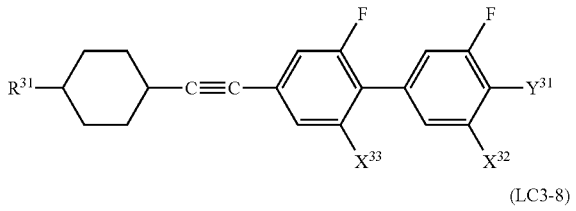
(LC3-8)
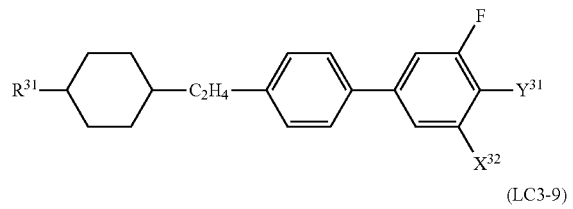
(LC3-9)
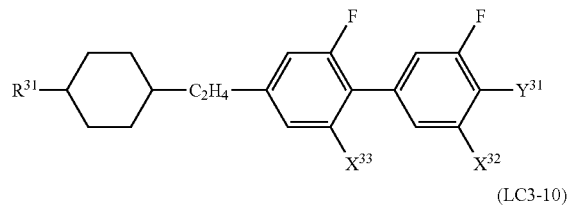
(LC3-10)
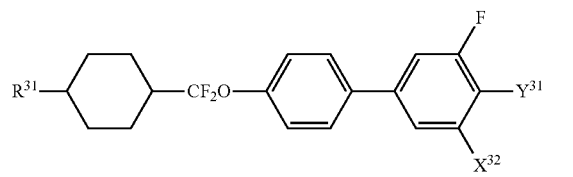
(LC3-11)
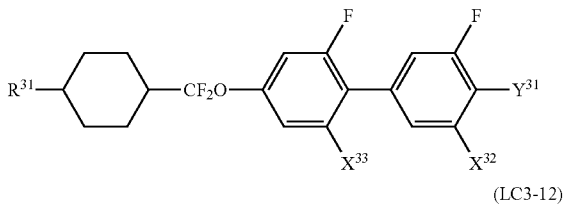
(LC3-12)
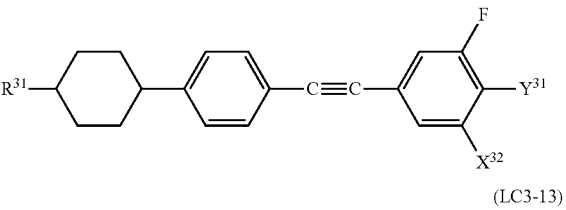
(LC3-13)
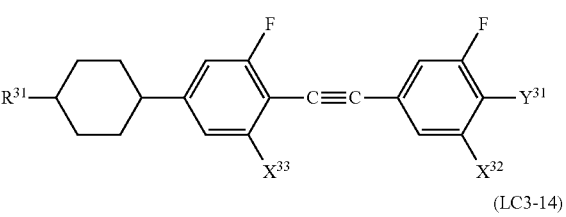
(LC3-14)
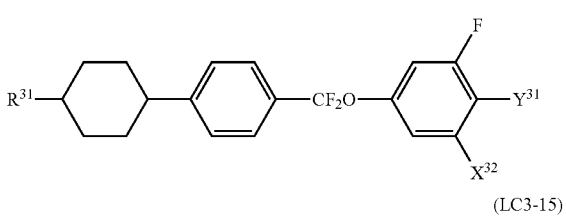
(LC3-15)
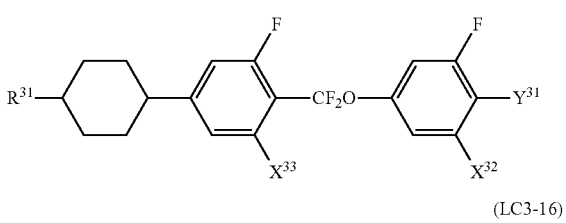
(LC3-16)
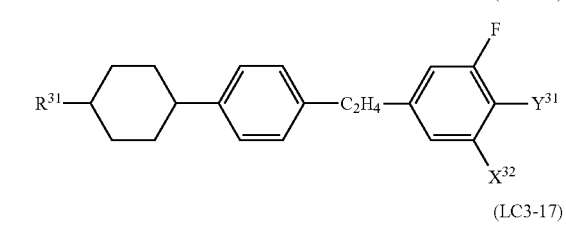
(LC3-17)
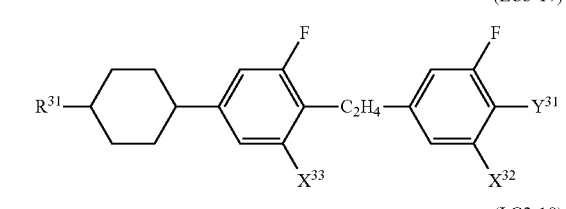
(LC3-18)
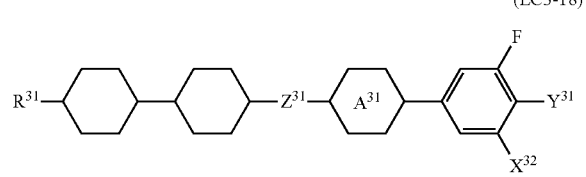

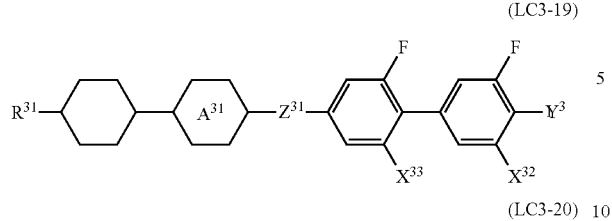 (LC3-19)

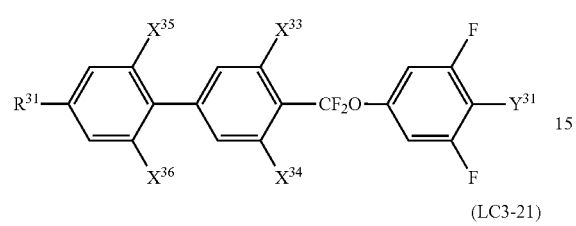 (LC3-20)

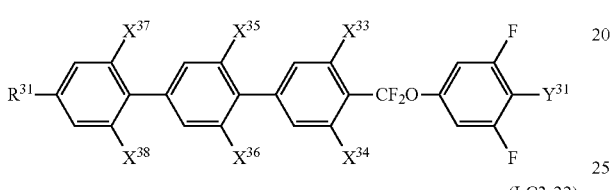 (LC3-21)

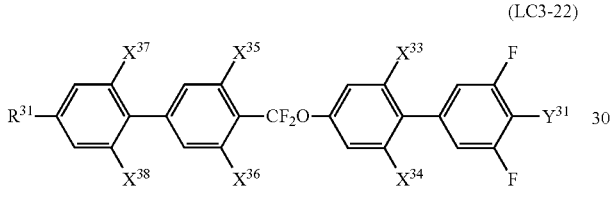 (LC3-22)

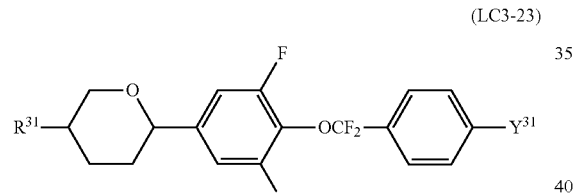 (LC3-23)

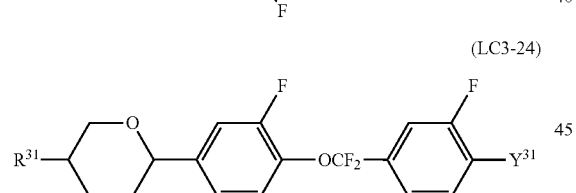 (LC3-24)

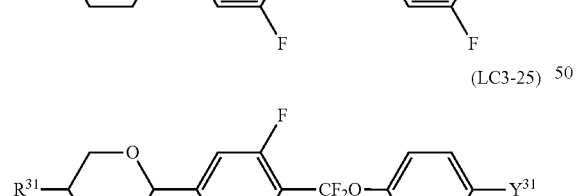 (LC3-25)

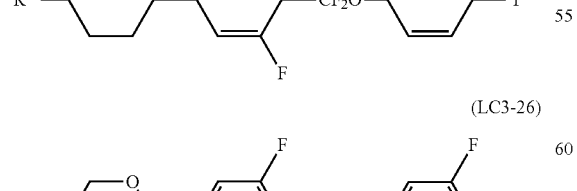 (LC3-26)

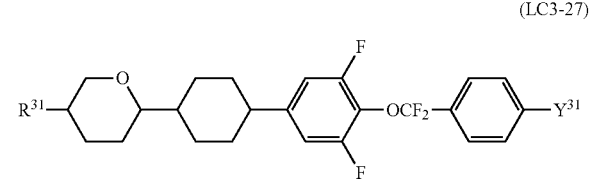 (LC3-27)

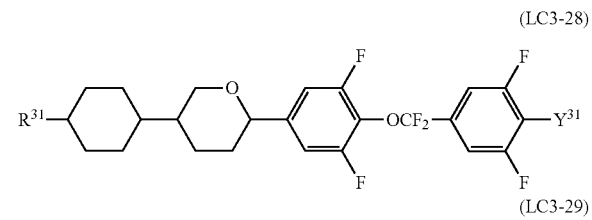 (LC3-28)

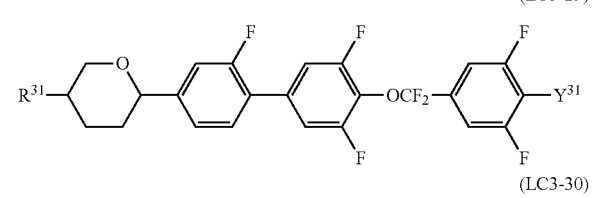 (LC3-29)

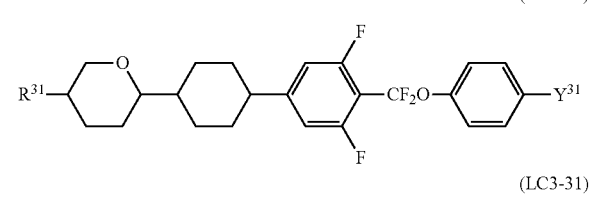 (LC3-30)

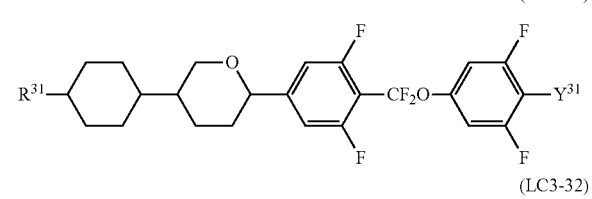 (LC3-31)

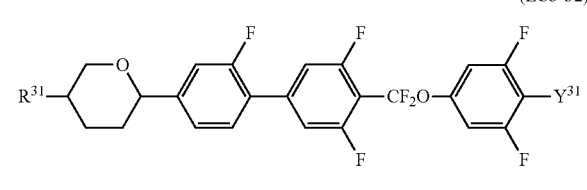 (LC3-32)

wherein in the formulae, $X^{33}$, $X^{34}$, $X^{35}$, $X^{36}$, $X^{37}$, and $X^{38}$ each independently represent H, Cl, F, $CF_3$, or $OCF_3$, and $X^{32}$, $R^{31}$, $A^{31}$, $Y^{31}$, and $Z^{31}$ are the same as those in claim 1.

5. The liquid crystal composition according to claim 1, wherein the liquid crystal composition contains one or more compounds selected from the group consisting of compounds represented by general formula (LC4-1) to general formula (LC4-23) as the compound represented by general formula (LC4):

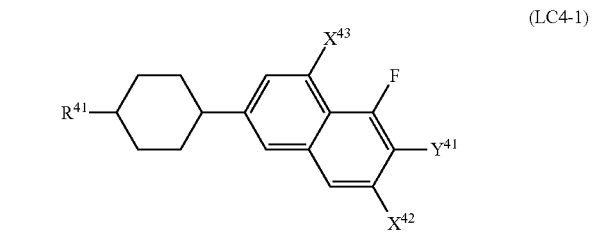 (LC4-1)

(LC4-2) 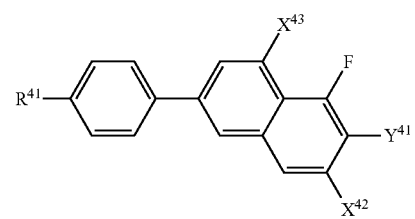
(LC4-3) 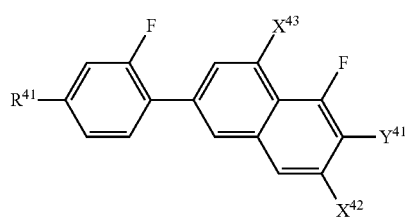
(LC4-4) 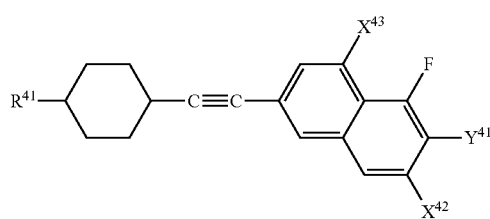
(LC4-5) 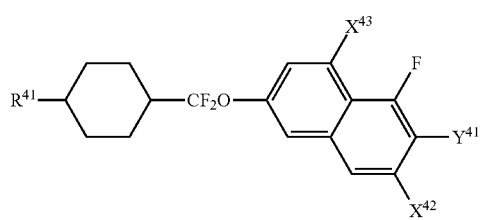
(LC4-6) 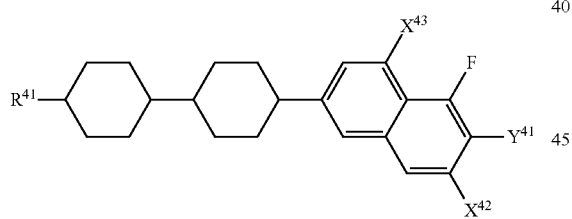
(LC4-7) 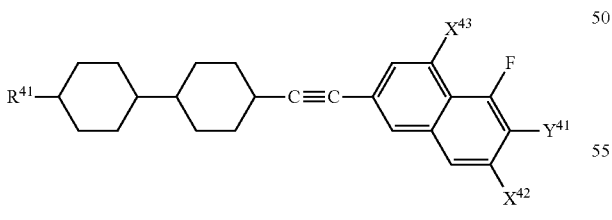
(LC4-8) 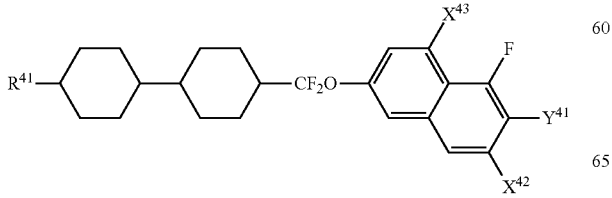
(LC4-9) 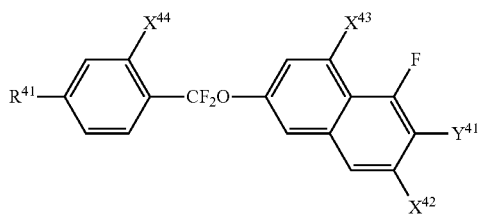
(LC4-10) 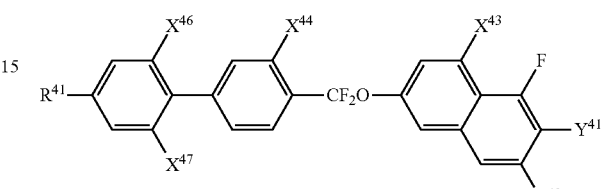
(LC4-11) 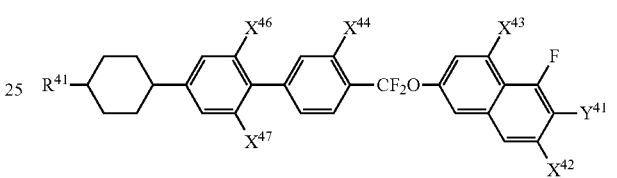
(LC4-12) 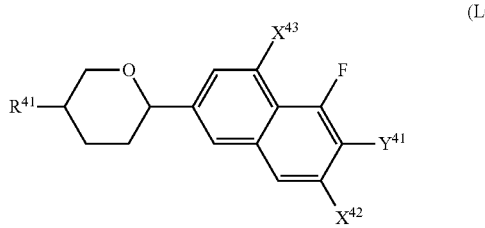
(LC4-13) 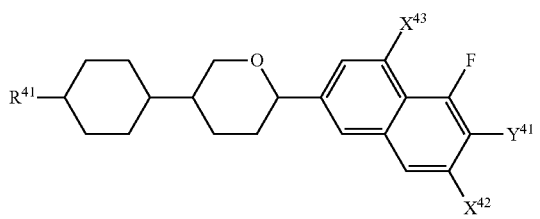
(LC4-14) 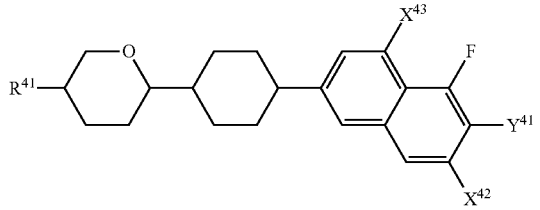
(LC4-15) 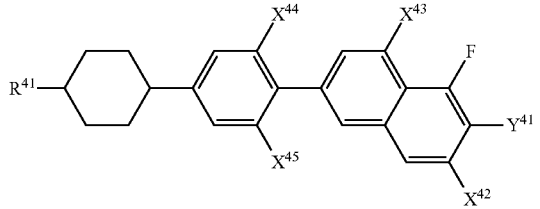

-continued (LC4-16)
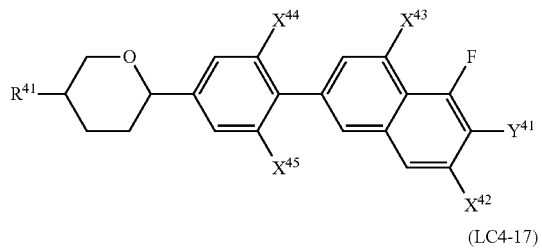

(LC4-17)

(LC4-18)
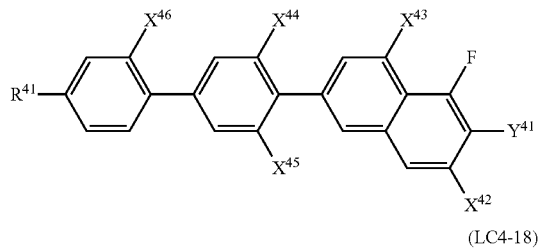

(LC4-19)
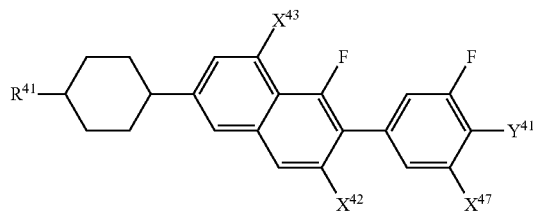

(LC4-20)

(LC4-21)
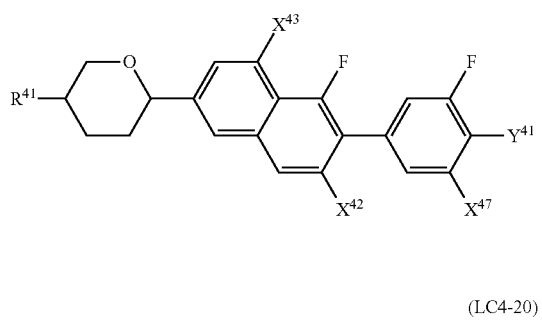

(LC4-22)
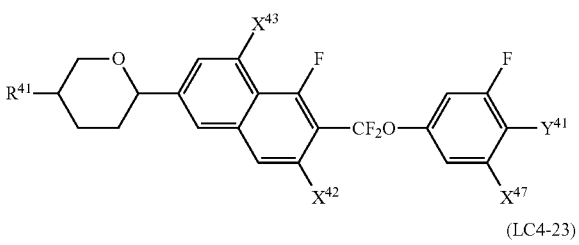

(LC4-23)

wherein in the formulae, $X^{44}$, $X^{45}$, $X^{46}$, and $X^{47}$ each independently represent H, Cl, F, $CF_3$, or $OCF_3$, and $X^{42}$, $X^{43}$, $R^{41}$, and $Y^{41}$ are the same as those in claim 1.

6. The liquid crystal composition according to claim 1, wherein the liquid crystal composition contains one or more compounds selected from the group consisting of compounds represented by general formula (LC5-1) to general formula (LC5-26) as the compound represented by general formula (LC5):

(LC5-1)
(LC5-2)
(LC5-3)
(LC5-4)
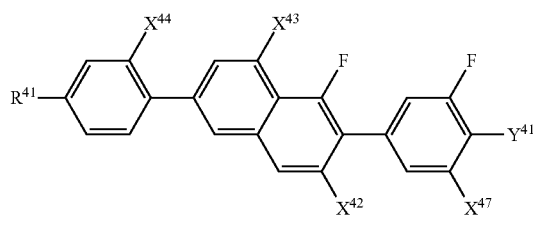

(LC5-5)
(LC5-6)
(LC5-7)
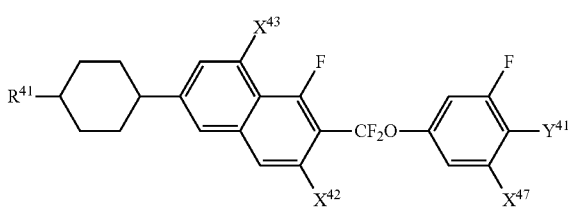

-continued (LC5-8)
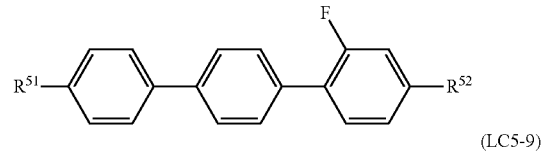

(LC5-9)
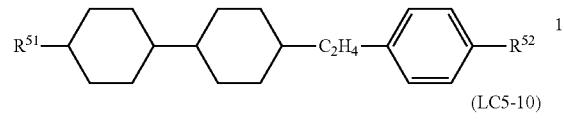

(LC5-10)
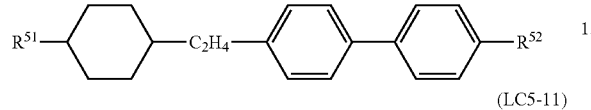

(LC5-11)
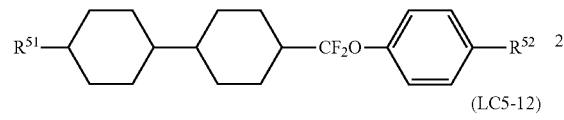

(LC5-12)
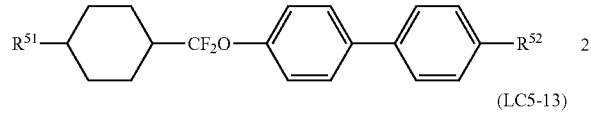

(LC5-13)
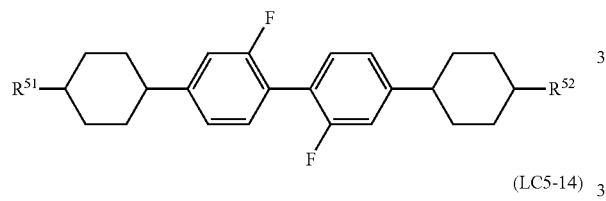

(LC5-14)
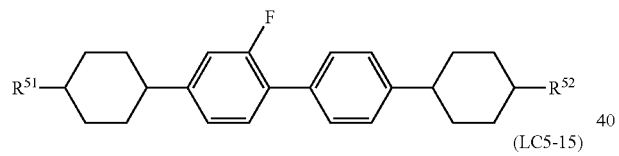

(LC5-15)
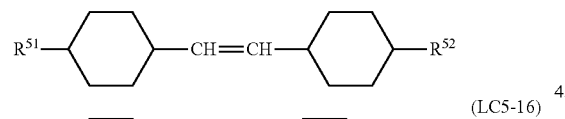

(LC5-16)
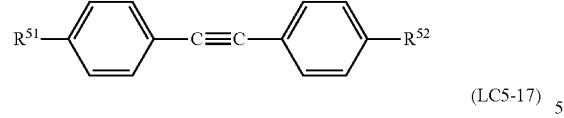

(LC5-17)
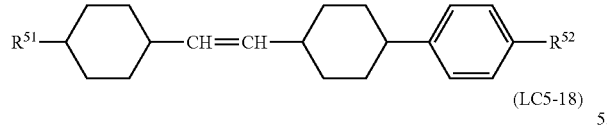

(LC5-18)
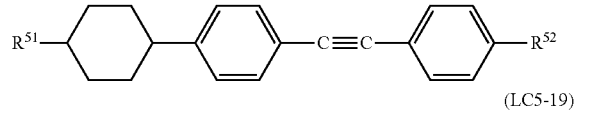

(LC5-19)
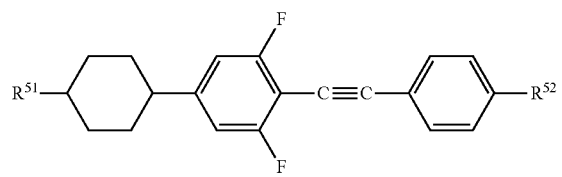

-continued (LC5-20)
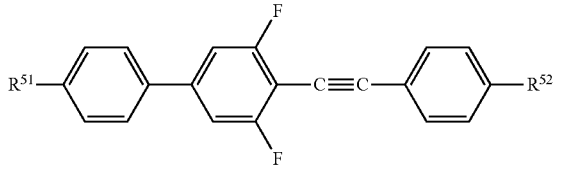

(LC5-21)
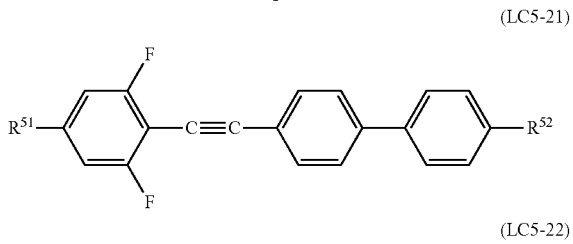

(LC5-22)
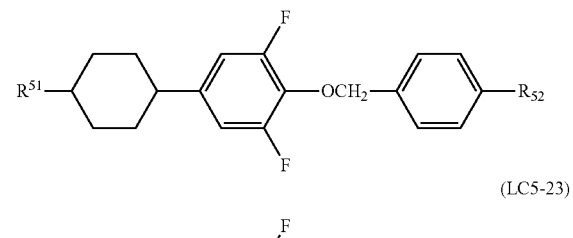

(LC5-23)
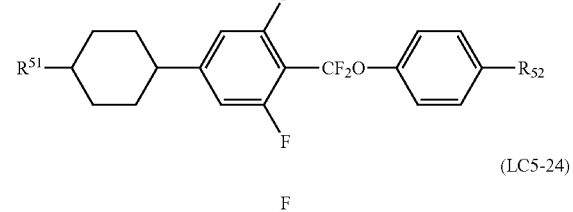

(LC5-24)
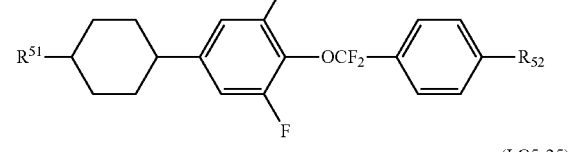

(LC5-25)
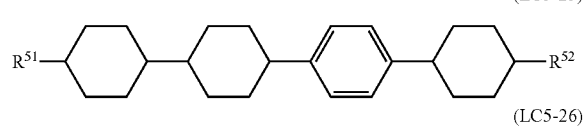

(LC5-26)
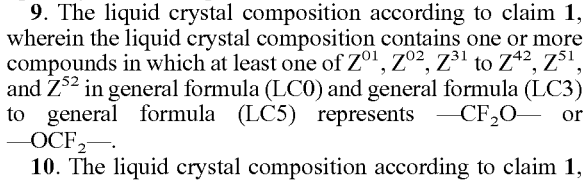

the formulae, $R^{51}$ and $R^{52}$ are the same as those in claim 1.

7. The liquid crystal composition according to claim 1, wherein the liquid crystal composition contains 5 to 50% by mass of one or more compounds in which at least one of $A^{01}$ and $A^{02}$ in general formula (LC0) represents a tetrahydropyran-2,5-diyl group.

8. The liquid crystal composition according to claim 1, wherein the liquid crystal composition contains one or more optically active compounds.

9. The liquid crystal composition according to claim 1, wherein the liquid crystal composition contains one or more compounds in which at least one of $Z^{01}$, $Z^{02}$, $Z^{31}$ to $Z^{42}$, $Z^{51}$, and $Z^{52}$ in general formula (LC0) and general formula (LC3) to general formula (LC5) represents —$CF_2O$— or —$OCF_2$—.

10. The liquid crystal composition according to claim 1, wherein the liquid crystal composition contains 30 to 70% by mass of the compound represented by general formula (LC5) and has a viscosity η of 20 mPa·s or less at 20° C.

11. The liquid crystal composition according to claim 1, wherein the liquid crystal composition contains one or more polymerizable compounds.

12. The liquid crystal composition according to claim 1, wherein the liquid crystal composition contains one or more antioxidants.

13. The liquid crystal composition according to claim 1, wherein the liquid crystal composition contains one or more UV absorbers.

14. A liquid crystal display device using the liquid crystal composition according to claim 1.

15. An active matrix driving liquid crystal display device using the liquid crystal composition according to claim 1.

16. A TN-mode, OCB-mode, ECB-mode, IPS-mode, or VA-IPS-mode liquid crystal display device using the liquid crystal composition according to claim 1.

17. A polymer-stabilized TN-mode, OCB-mode, ECB-mode, IPS-mode, or VA-IPS-mode liquid crystal display device that uses the liquid crystal composition according to claim 11 and is produced by polymerizing the polymerizable compounds in the liquid crystal composition in the absence or presence of applied voltage.

18. The liquid crystal display device according to claim 14, wherein an alignment layer that has a surface that comes into contact with liquid crystal molecules and causes the liquid crystal molecules to align horizontally, tilt, or align vertically includes an alignment film containing at least one compound selected from polyimide (PI), polyamide, chalcone, cinnamate, and cinnamoyl.

19. The liquid crystal display device according to claim 18, wherein the alignment layer according to claim 18 further includes a polymerizable liquid crystal compound or a polymerizable non-liquid crystal compound.

20. The liquid crystal display device according to claim 18, wherein an alignment film prepared by an optical alignment technology is formed as the alignment layer at the surface that comes into contact with the liquid crystal composition.

* * * * *